United States Patent [19]

Yamauchi et al.

[11] 3,760,364

[45] Sept. 18, 1973

[54] ELECTRONIC SWITCHING SYSTEM

[75] Inventors: Masaya Yamauchi; Ko Muroga, both of Tokyo; Hirotoshi Shirasu, Yokohama; Koji Hirose, Tokyo; Toshihiko Nakajo, Kawasaki, all of Japan

[73] Assignee: Nippson Telegraph & Telephone Public Corporation; Nippon Electric Co., Ltd., Hitachi Limited Oki Electric Industry Co., Ltd., Fujtsu Limited

[22] Filed: Nov. 4, 1971

[21] Appl. No.: 195,681

[30] Foreign Application Priority Data

Nov. 6, 1970 Japan ................................ 45/97200

[52] U.S. Cl. ................................ 340/172.5, 179/18

[51] Int. Cl. ......................... G06f 15/00, G06f 15/16

[58] Field of Search ..................... 340/172.5; 179/18

[56] References Cited

UNITED STATES PATENTS

| | | | |
|---|---|---|---|
| 3,303,474 | 2/1967 | Moore et al. | 340/172.5 |
| 3,252,149 | 5/1966 | Weida et al. | 340/172.5 |
| 3,409,877 | 11/1968 | Alterman et al. | 340/172.5 |
| 3,553,654 | 1/1971 | Crane | 340/172.5 |
| 3,444,528 | 5/1969 | Lovell et al. | 340/172.5 |

*Primary Examiner*—Gareth D. Shaw
*Attorney*—Richard C. Sughrue et al., Darryl Mexic, Robert V. Sloan, Peter D. Olexy, J. Frank Osha and Robert J. Seas, Jr.

[57] ABSTRACT

A stored program controlled electronic switching system provided with large capacity economical peripheral memory equipments, such as magnetic drums, in which a part of the basic memory content, not subject to high speed access time, is stored permanently and also continuously varying information is periodically copied for the purpose of backing up the random access main memory devices to decrease the number of the main memory devices. The switching system comprises data channel devices consisting of channel multiplexer and sub-channel equipment in order to obtain a standard interface scheme between the central control units and various input-output devices. The system further comprises four-wire type trunk link network to be controlled by the same central control units for obtaining wider system flexibility for the application of accommodating data switching facility, trunk switching facility, etc.

4 Claims, 22 Drawing Figures

ELECTRONIC SWITCHING SYSTEM

BACKGROUND OF THE INVENTION

1. Field of the Invention

The present invention relates to an electronic switching system, more particularly to a stored program controlled electronic switching system used, for example, in telephone exchanges, data exchange services, etc.

2. Description of the Prior Art

Various types of stored program controlled electronic switching systems are known. These conventional systems operate primarily in what is termed the synchronized operating mode due to the stringent reliability requirement. In the synchronized operating, the central control units and the memory devices of the system are made duplicated to provide systems redundancy. If a fault should occur in either of the duplicated devices, the other device, operating in synchronism with the defective device takes the place of the faulty device so that the system continues substantially uninterrupted.

In a stored program controlled electronic switching system, connecting process which occurs when a telephone call is made is analyzed in detail and a plurality of the same kind of processes are treated in a short time. The system which carries out this connecting process is termed a multiplex processing system. In the multiplex processing system, a small quantity of data are frequently transferred between the central control units and the memory equipment. This frequent transfer of a small part of the stored data and programs requires that the such data and programs be stored in high speed random access main memory devices. Therefore, the known systems have disadvantages in that the system cost is high by a reason of the need to provide at least several sets of such costly random access high speed memory devices, each having a capacity of some million bits where their only function is to control the basic switching operation. Moreover, the number of required memory devices is doubled in the completely duplicated operation scheme so that the cost of the memory devices in proportion to the overall equipment cost becomes very high.

Recently the demand for expanding service facilities in an electronic switching system has increased. For instance, new services for telephone subscribers, such as call transfer, call waiting, etc., video switching service, data communication service, etc., which were not included in conventional concept of telephone switching service are now available. The introduction of the these services requires an increase in the capacity of memory equipment.

Furthermore, as the reliability of the electronic components has been increased, the redundancy provision of a system such as complete duplication seems excessive in view of economy.

SUMMARY OF THE INVENTION

An object of the present invention is to provide a stored program controlled electronic switching system in which the conventional surplus redundancy of the system is avoided while obtaining very high system reliability as well as an expansion of the operating modes for multi-object utilization of the system, A further object is to improve upon the conventional systems whereby various input-output devices can easily be connected to the switching system.

To accomplish the above objectives, the invention provides a stored program controlled electronic switching system which includes;

duplicated central control units;

duplicated data channel devices;

a plurality of main memory devices being accessible to any one of the above units or devices; and a pair of peripheral memory devices operating in asynchronized mode and connected to each one of the duplicated data channel devices and being able to transfer information contents from/to the main memory devices via respective data channel devices.

By the provision of the above elements in the switching system, the information to be processed is duplicated by periodically copying a part of the information stored in the main memory devices, alternately into respective one of the peripheral memory devices and thus, in the case of data mutilation, copied information can be read out from one of said peripheral memory devices by transferring the copied information into the main memory device.

In one mode of operation, the duplicated central control units operate in synchronism by matching processed information with each other by retrieving identical data from respective main memory devices. In another operating mode, two essentially independent processing systems are realized, One processing system consist of one central control unit and a part of the main memory devices and operates to process data independent of the other processing system consisting of the another central control unit and other part of the main memory devices also operating independently.

BRIEF DESCRIPTION OF THE DRAWINGS

In order to give a clear understanding of the present invention, reference will be given to the accompanied drawings in which.

Figure 15:
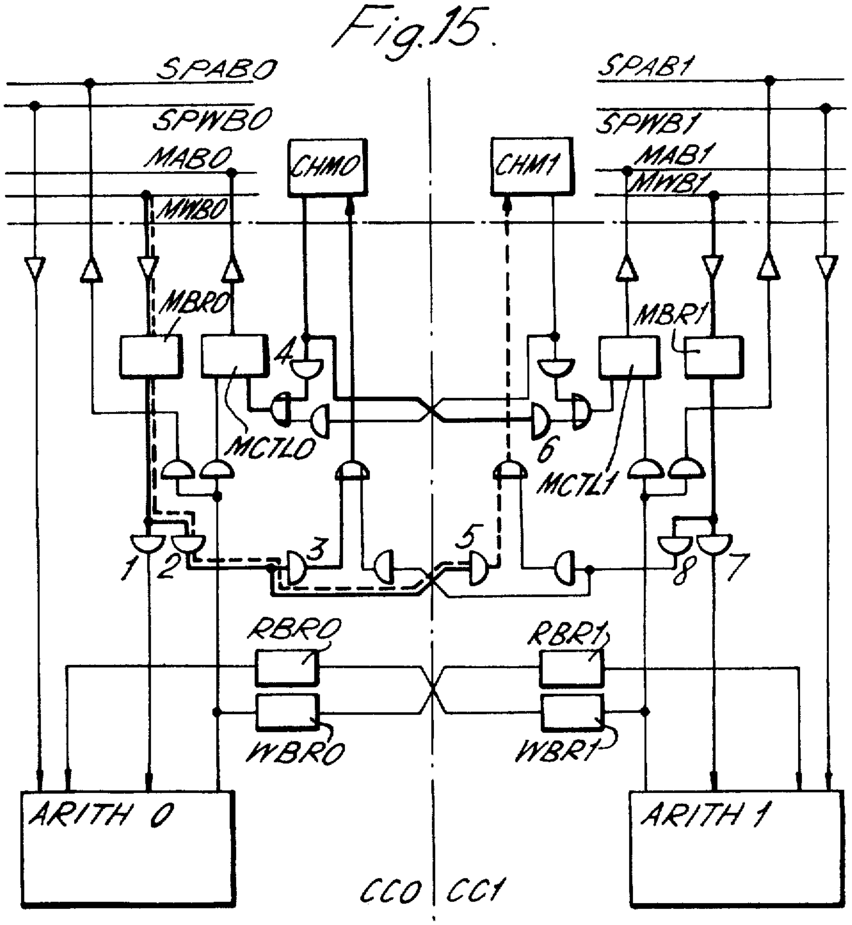
Figure 17A:
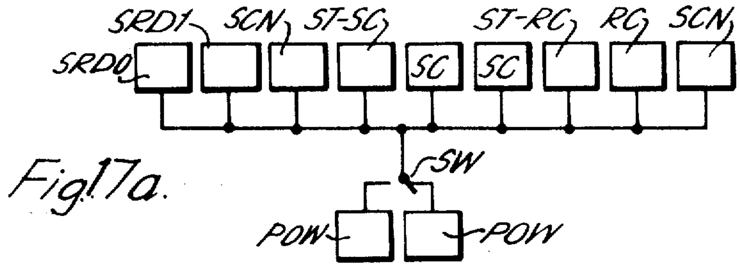
Figure 17B:
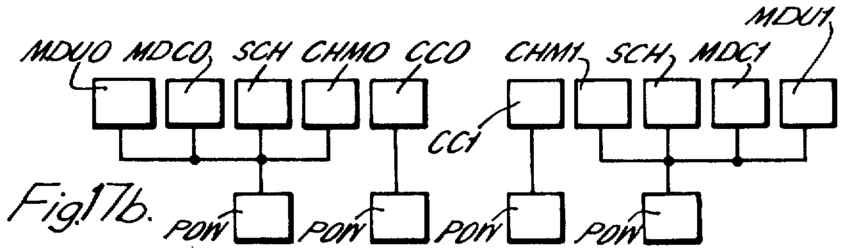

FIGS. **14*a* and 14*b*** are simplified circuit diagrams of route controlling flip-flop circuits for controlling the transfer route of the information signals;

FIG. 15 is a circuit diagram illustrating additional details of the system for controlling the transfer route of the information signal;

FIGS. **16*a*, 16*b*, 16*c* and 16*d* depict various modes of operation of the system in which possible combinations of the respective functional units are shown; and FIGS. 17*a* and 17*b*** depict block diagrams for possible embodiments of the power supply system.

DESCRIPTION OF THE PREFERRED EMBODIMENTS

For a better understanding of the present invention the construction and operation of a conventional electronic switching system will first be described.

Figure 1:
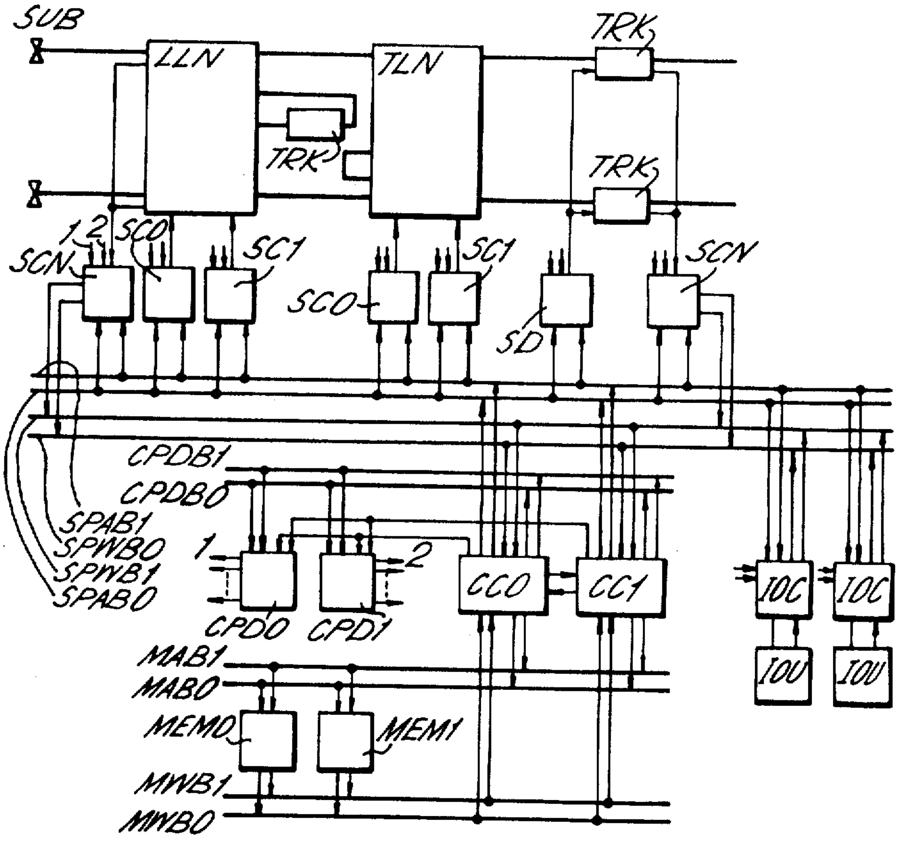
Fig. 1. PRIOR ART
FIG. 1 is a block diagram showing a typical embodiment of a conventional electronic switching system.

FIG. 1 is a block diagram illustrating the essential part of a conventional electronic switching system.

In FIG. 1, SUB generally depicts the subscriber of the switching system. LLN is a line link network and TLN is a trunk link network. Networks LLN and TLN constitute a two-wire speech path system in the switching. The blocks denoted TRK generally illustrate trunk circuits provided for the various networks. The speech path system further comprises a scanner SCN, a switch controller SC for the networks LLN and TLN, and a signal distributor SD for the trunk circuit TRK. The block denoted IOU is an input-output unit controlled by an input-output controller IOC. The combination of IOU and IOC is generally termed an input-output device. CPD is a central pulse distributor for designating a device to be operated among the groups of the above mentioned devices SCN, SC, SD and IOC. For instance, if a scanner SCN provided for the line link network LLN is to be seized from a pulse distributor $CPD_0$, a designating signal is sent via a designating wire 1, whereas if the same device is to be designated from a pulse distributor $CPD_1$ the designating signal is sent via a designating wire 2. SPAB is a speech path address bus and SPWB is a speech path answer bus, CPDB is a central pulse distributor bus, MAB is a memory address bus and MWB is a memory answer bus. $CC_0$ and $CC_1$ are central control units for controlling the overall system by reading the processing program stored in main memory devices $MEM_0$, $MEM_1$ via the address and answer buses MAB, MWB respectively and for interconnumicating the controlling signal with other devices.

It is to be noted that the suffixes 0 and 1 attached with the symbols, such as CC, MEM, etc., denote that these devices are duplicated in order to secure uninterrupted operation of the system even when either one of the duplicated device becomes faulty. In such a redundant arrangement, if we assume that the the main memory must be comprised of *n* devices, 2n memory devices must be provided for obtaining the redundant scheme.

The central control units $CC_0$ and $CC_1$ operate simultaneously and redundantly and match each other so that the processed data in one unit is checked with the data in the other. In the normal operating mode, $CC_0$ cooperates with the memory device in the "0" system, i.e., cooperates with $MEM_0$ and $CC_1$ cooperates with the memory device in the "1" system, i.e., cooperates with $MEM_1$ and the both units $CC_0$, $CC_1$ operate just the same as a single unit by taking the mutual matching for the processed data. This mode of operation is referred to as a synchronized operating mode, which has advantages in obtaining a highly reliable processing function and a speedy fault detecting function. As shown in FIG. 1 the combination between respective duplicated units belonging to the "0" and "1" systems of the various devices directly used for the switching operation such as CC, MEM, CPD, SC, etc. may be freely switched to form various operation configurations. Accordingly, the overall system reliability can be made very high. On the other hand, as explained previously, such the completely duplicated system has a drawback that it is costly. More particularly, the above mentioned duplicated system requires at least several sets of random access high speed main memory devices for the execution of the basic switching operation and such costly memory devices must be provided in duplicate.

FIG. 1 depicts only one example of the conventional electronic switching system. There are other systems in which a part of the programs, such as the fault detecting program, etc., are accommodated in paper tapes or in magnetic tape devices so as to prevent an increase of the cost of the memory devices. However, as far as the processing of the data for controlling the direct switching operation is concerned, the arrangement is nearly the same as the embodiment shown in FIG. 1. It may be said that the known systems for obtaining high system reliability are essentially of the duplicated, that is redundant type.

The present invention is concerned with an electronic switching system in which excessive redundancy, are avoided to obtain economical memory systems while maintaining the required reliability for a telephone switching service. The system of the invention is highly flexible permitting it to be used in a variety of modes of operation. In addition, it easily accepts a plurality of input-output devices. One embodiment of the present invention will be explained with reference to the accompanied drawings and according to items classified below.

Figure 2:
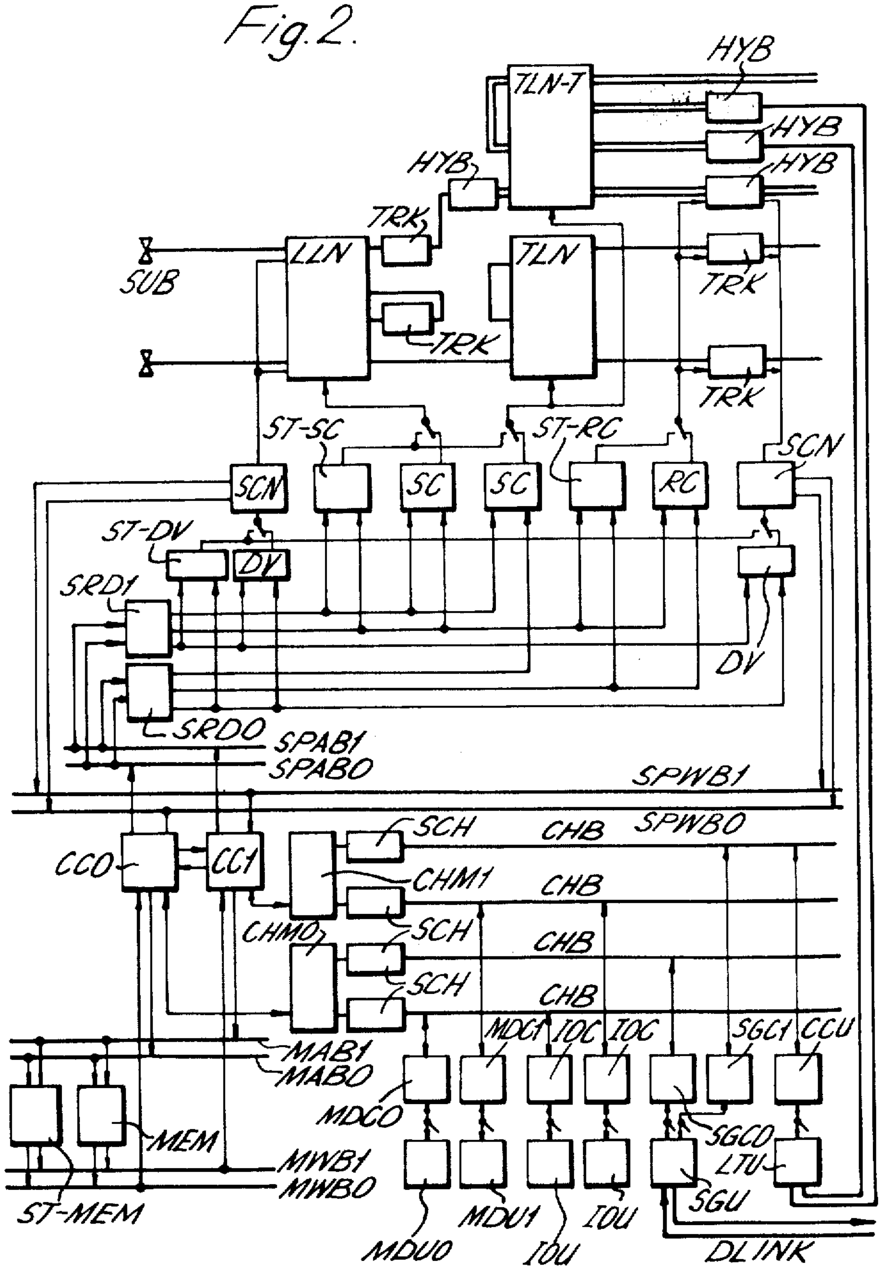
FIG. 2 is a block diagram depicting an embodiment of an electronic switching system according to the present invention.

I. Embodiment
II. Central Control Unit (CC)
III. Data Channel (DCH)
IV. Main Memory Devices (MEM)
V. Magnetic Drum Memory (MDC, MDU)
VI. Common Channel Signal Equipment (CSE)
VII. Communication Control Unit (CCU) and Digital Converter (LUT)
VIII. Speech Path Equipment I. Embodiment FIG. 2 is a block diagram showing the basic construction of an electronic switching system made in accordance with the present invention. Identical elements in FIGS. 1 and 2 are designated by the same symbols.

Like the conventional system, the central control units CC are duplicated In FIG. 2 this is illustrated by blocks $CC_0$ and $CC_1$. The main memory devices MEM are random access memory devices and are connected to the duplicated central control units $_0$ and $CC_1$ via memory address buses $MAB_0$ and $MAB_1$ and memory answer bus MWB.

A block, denoted ST-MEM is a standby memory device provided for a plurality of the main memory devices MEM. According to one aspect of there present invention, the is provided only one standby memory device ST-MEM for a plurality of main memory devices MEM. The block denoted as CHM is a channel multiplexer comprising control elements common to the channels between the main memory devices MEM and the input-output devices IOU, IOC for controlling the information transfer therebetween. SCH is a subchannel device provided for a group of channels for controlling the respective information transfer to the channels. The combination of CHM and SCH is termed as a data channel.

The addition of data channels to the electronic switching system is one feature of the present invention. The interface between the data channels and the input-output devices are standardized output device having the standard interface may be used. As mentioned above, the data channel device of the present invention is sub-divided into two devices, i.e., the subchannel device SCH and the channel multiplexer CHM so that a cost reduction is possible by suitably allocating the controlling functions between said two devices.

MDU is a magnetic drum unit and MDC is a magnetic drum controller and they constitute an important part of the system of the present invention.

The magnetic drum unit and magnetic drum controller functions as a large capacity peripheral memory, for backing up the main memory devices.

Although a magnetic drum is illustrated in the drawing, this is merely an example and the present invention is not limited to the specific embodiment. If the access time is agreeable for the processing operation other large capacity memory devices, such as a magnetic disk unit can be used in the place of the magnetic drum unit MDU.

SGU is a signal unit for a common signalling system and SGC is a signal controller provided for a group of the signal units SGU. CCU is a communication control unit and LTU is a line terminal circuit of the CCU and is connected through a hybrid circuit HYB to the trunk link network TLN. The devices SGC, SGU and CCU, LTU are controlled from the central control unit CC via the data channel device CHM, SCH just the same as the input-output devices.

SRD is a signal receiver-distributor which receives signal via speech path address bus SPAB and distributes the signal for the various devices, i.e., for scanner driver DV, standby scanner driver ST-DV, switch controller SC, standby switch controller ST-SC, relay controller RC for controlling relays in trunks TRK and a standby relay controller ST-RC.

A further remarkable feature of the present invention is the provision of trunk switching facility in the form of a four-wire trunk link network TLN-T. As shown in FIG. 2, the interconnection between the above mentioned four-wire trunk link network TLN-T and the aforementioned two-wire network is made via a trunk circuit TRK and a hybrid circuit HYB constituting a link corresponding to a junctor in an ordinary switching network.

In a stored program controlled electronic switching system, the cost of the required memory equipment is a high percentage of the overall installation cost of the system. Accordingly, there is a general tendency for enlarging the capacity of a switching system so as to decrease the unit cost of the system per line. From this standpoint, the introduction of the four-wire trunk switching facility in the form of the four-wire trunk link network TLN-T affords a great advantage for the overall economy of the system.

The magnetic drum device and particularly the manner of utilization in the system of the present invention will be explained. The magnetic drum is provided in the switching system for two main tasks. The first one is to accommodate programs and data which do not require high speed access and the second one is to provide periodical copies of the contents of the main memory devices for backing up the main memory devices in case they fail.

Usually speaking, it is preferred to make the access time to a memory device as short as possible in a process of switching operation in telephone service. However not all the programs and data provided for the operation require such a high speed access which can only be obtained using random access high speed main memory devices. For instance, such programs as the diagnostic program for locating a faulty point in a faulty device, or an administration program such as for observing the operational service status and reading it out, etc., may be accommodated in the peripheral memory devices and may be transferred to the main memory devices when required. Furthermore, in the telephone switching operation, information concerning subscriber's data, such as telephone number, accommodated location on a switch frame, number of calls, the service class to be rendered to a subscriber, etc., is to be provided for every subscriber. The number of times the subscribers' data each time a telephone connection is made is about 3 – 5 times, maximum. Accordingly, it is sufficient to make the access time on the order of a few milliseconds. In a system made in accordance with the present invention, such programs and data not requiring high speed access are accommodated in the magnetic drum unit.

In a practical device made in accordance with the present invention, the cost of the magnetic drum device per bit can be made in an order of 1/50 of that of the random access main memory device. In a large capacity telephone switching system, servicing on the order of 40,000 subscribers, the required memory capacity for only the subscriber data may be nearly ten million bits for identifying various service classes. Accordingly, the economical merit of the present invention by the introduction of the magnetic drum is remarkable.

The second function of the magnetic drum is that of a back up for the main memory devices. This offers a cost reduction for memory devices because by the introduction of such a back up memory, the main memory need not be completely duplicated. In the system of the present invention the information contents of the main memory devices are copied into the magnetic drum. The fixed programs and data in the main memory devices are copied in the magnetic drum initially and the continuously varying information contents, such as data concerning the switching process are copied periodically into the magnetic drum. More precisely, the variable data contained in the main memory devices is transferred to the magnetic drum once per several seconds and the copied information is renewed always. Should one of the main memory devices become faulty, the copied information in the magnetic drum is transferred to the standby memory device ST-MEM and the standby memory device ST-MEM takes the position of the main memory device which is now faulty. In this back up scheme, the varying data received after the copying but prior to the occurrence of a fault is lost. However, the subscribers, which are in the conversation stage, are not influenced substantially by such loss of the varying data information for a short duration. The subscribers originating calls during such an interrupted period will not complete in calls, but the number of such subscribers is not large. For instance assuming the required time from originating a call to the completion of connection is 15 seconds and that the variable data during 5 seconds is lost, the subscribers originating calls during maximum period of 20 seconds are not processed properly. The probability of occurrence of the main memory device is assumed less than once per several months, therefore the fault due to this interruption is tolerable for the service in comparison with the fault due to other causes.

II Central Control Unit CC

Figure 3:
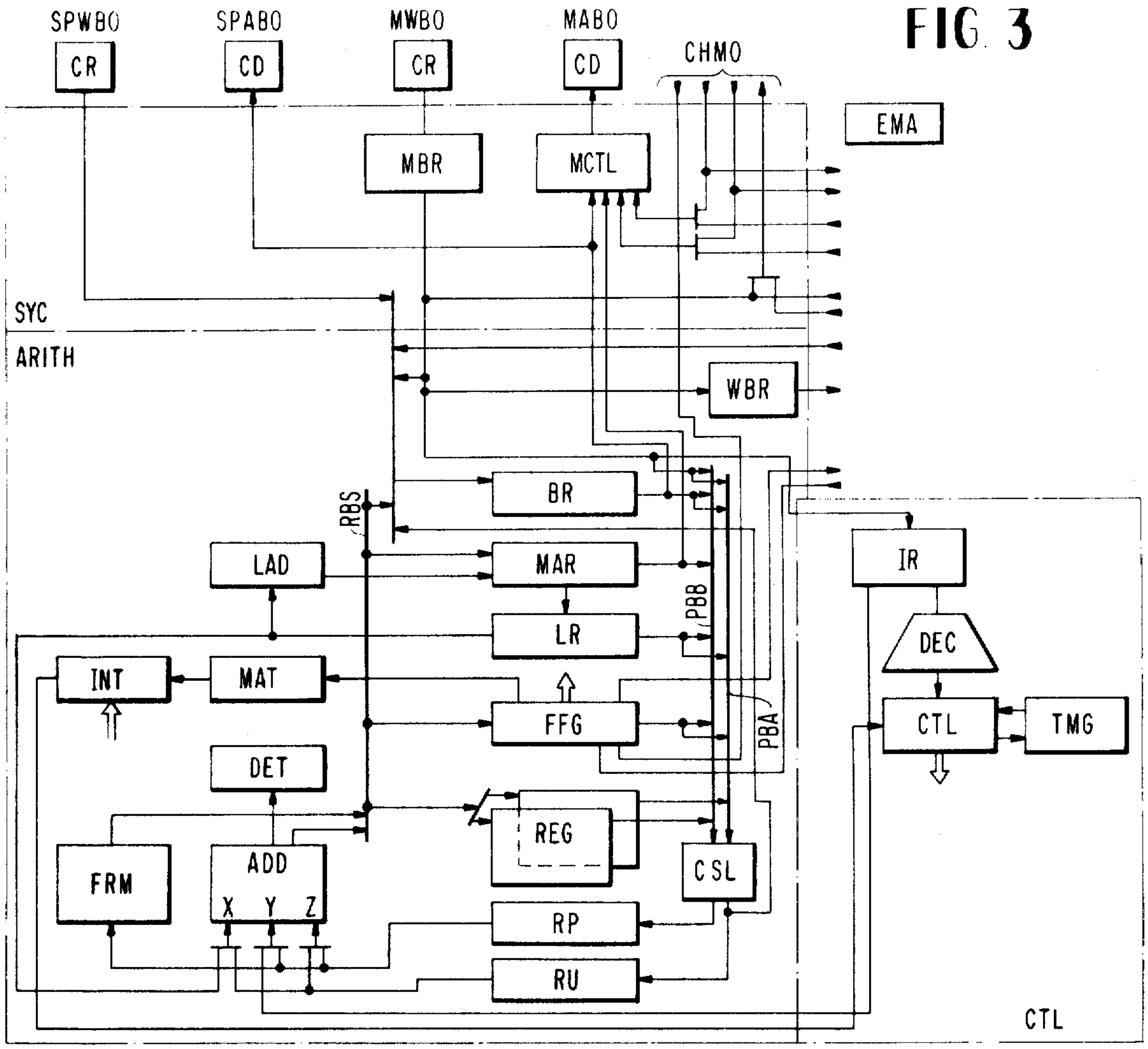
FIGS. 3—12 illustrate in detail the elements forming the switching system of the invention.

FIG. 3 depicts a block diagram of a central control unit CC according to the present invention. The central control unit CC is a device for controlling speech path peripheral devices and I-O devices by successively reading out the program stored in the main memory devices and prosecuting the programs, after decoding and understanding the instructions.

The central control unit CC consists from the following three main sections.

1. Main control section CTL for distributing gate signals for controlling operation of the central control unit CC by storing and reading out the instruction.
2. Arithmetic control section ARITH for making operation.
3. System control section SYC for controlling transfer of data between central control unit CC, data channel device DCH, main memory device MEM.

The main control section CTL further consists of the following circuit.

4. Instruction register IR for storing the instruction derived from the main memory device MEM.
5. Decoder DEC for decoding the instruction from the instruction register IR.
6. Control circuit CTL for distributing a gate signal for controlling, storing and delivery of information for register groups in the arithmetic control section ARITH and system control section SYC by receiving an output from the decoder DEC.
7. Timing generator TMG for supplying a series of timing pulses required for the control circuit CTL.
8. General register REG to be designated by the instruction.
9. Latch register, RP, RU, to be used in the operation.
10. Buffer register BR.
11. Memory address register MA for storing addresses of the main memory devices.
12. Location register LR for memorizing an address of an instruction under prosecution.
13. Flip-flop group FFG for controlling the system.
14. Clear shift logic circuit CSL for making logic operation, shift, designation of carry.
15. Adder ADD for making an addition and subtraction.
16. Find right most one circuit FR for detecting "1" bit at the extreme right of 1 word consists of 32 bits.
17. Location adder LAD for adding one for the address of the instruction.
18. Matcher circuit MAT for making collation of the matching of the result of logical operation by duplicated central control units.
19. Interrupt circuit INT for originating interruption signal.
20. Operand bus PBA, PBB, result but RBS for connecting various registers and logic circuits and for transmission of information.
21. A number of gate circuits for controlling accommodation and supply of information in the register and logic circuits.
22. Detector DET for detecting an over-flow in the result of logic operation.
23. Write buffer register WBR for introducing controlling information into mate central control unit.

The system control section consists of the following circuit.

24. Memory buffer register MB for temporary storing information obtained from the main memory devices.
25. Memory control circuit MCTL for controlling access to the main memory devices by receiving memory access request from the data channel device DCH and arithmetic control section ARITH.

The operation of the main control section CTL and the arithmetic control section ARITH is generally the same as the well-known operation of the central processor unit in the universal type computer or stored program controlled electronic switching system, so that a detailed explanation is omitted. But, as a general example, the content of the general register REG and the case of addition of the data in the main memory device will be explained.

In this case, at first the address of the main memory device storing the instruction for addition is set in the memory address register MAR and is read out from the main memory device via the memory control circuit MCTL. The result is stored in the instruction register IR via the memory buffer register MBR. In the instruction register IR, the instruction is read by the decoder DEC and the gate signal required for the prosecution of the instruction is derived from the control circuit CTL. On one hand, the address of the data in the instruction used for the logic operation is set in the memory address register MAR via the adder ADD and again the main memory device is given an access via the memory control circuit MCTL. The logic operation data thus read out is introduced in the latch regiser RP from the memory buffer register MBR via operand bus PBB, clear shift logic circuit CSL. On the other hand, the content of the general register REG being the object of the logic operation is introduced in the latch register RU via the operand bus PBA and clear shift logic circuit CSL. The data in the latch register RP and RU are added in the adder ADD and the results are introduced both in the general register REG and in the buffer register BR. The buffer register BR is checked for the matching with the result of the logic operation of mate central control unit and the matcher circuit MAT.

The control of mode of operation of the central control unit CC, such as active mode, standby mode, is made by controlling a particular flip-flop in the flip-flop group FFG by program or by manually operating a key. The control of connection between the central control unit CC and the data channel device DCH is also controlled by the content in the corresponding flip-flop of the flip-flop group FFG. In other words, the central control unit CC is provided with a flip-flop for controlling connection of each respective sub-channel SCH. In the synchronous operation mode, the content in the two flip-flop for controlling sub-channel into the central control unit is identical with each other and the data channel DCH is operated by the OR logic in both the central control units CC. In the separate operation mode, the content of the flip-flop for controlling sub-channel in the on-line central control unit CC and off-line central control unit CC should be in composite relationship. The combination between the main memory device MEM and the central control unit CC is controlled by the corresponding flip-flops in the flip-flop group FFG. In the synchronous operation mode, only the active central control unit is allowed to write in the main memory device.

The request to obtain an access to the main memory device is also sent from the data channel device DCH which effects data transfer autonomously between the main memory device MEM and other I-O device from the central control unit CC. Such request is received by the memory control circuit MCTL of the system control section SYC, and the main memory device MEM is given an access according to the priority sequence of data channel device $DCH_0$, $DCH_1$, and central control unit CC.

At the time of fault of the central control unit the operation of the system is interrupted and the system is once separated from both of the central control unit CC and by means of hardware devices a combination of a central control unit CC and a main memory device MEM are established and the necessary test program is loaded from the drum of data channel device DCH in the same system with the central control unit CC by the hardware device and the test is effected If the test is not succeeded within a certain time period, the combination is successively changed by an emergency circuit EMA The emergency circuit EMA is started by a faulty OR logic in both central control units in the synchronous mode, and is started only by a fault of on-line central control unit in the separate mode.

III Date Channel DCH

Figure 4:
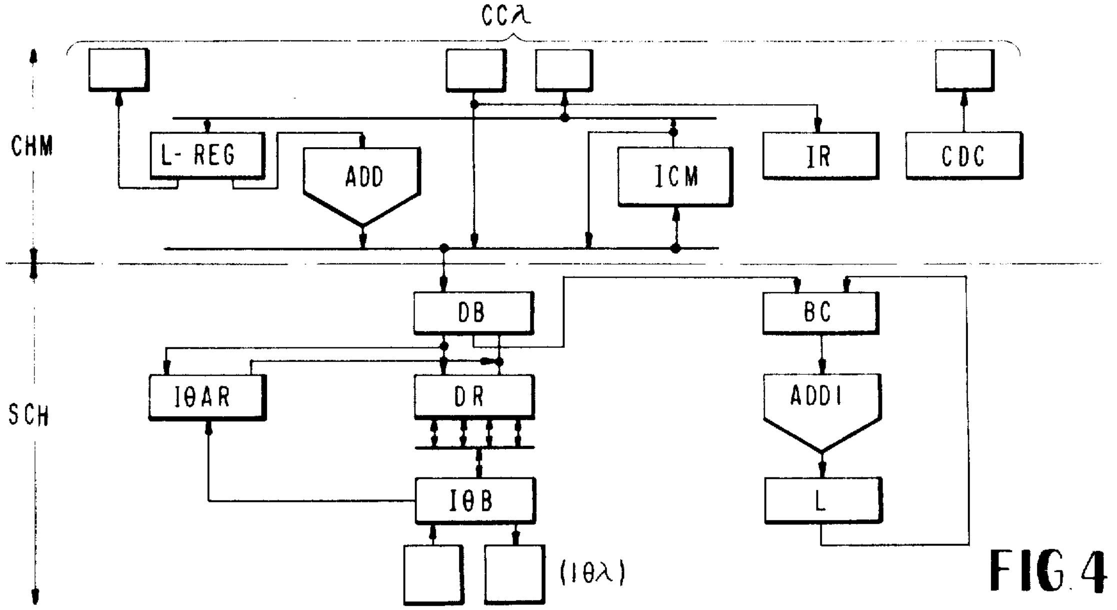

FIG. 4 illustrates a block diagram of the data channel DCH according to the present invention.

The data channel DCH is started by an input-output instruction from the central control unit CC and controls data transfer operation between the main memory MEM and the input-output device IO and controls data transfer autonomously in parallel with the operation of the central control unit CC so as to effectively utilize operating function of the central control unit CC.

The data channel device DCH consists of channel multiplexer CHM having aggregated function for the function common to a number of logical data channel devices DCH and a function to use one at a time, and sub-channel SCH function-ning each independent function.

Channel multiplexer CHM comprises;

1. instruction register IR for storing input-output instruction from the central control unit CC,
2. condition code CDC for indicating operating mode of DCH to the central control unit CC,
3. IC memory ICM for storing control instruction of DCH,
4. adder ADD for counting instruction address and transferring words, and
5. latch register L-REG for temporary storing result of the logic operation.

The sub-channel SCH comprises;

6. data buffer DB for reciprocating a data in word unit with CHM,
7. IO buffer for reciprocating the data in byte unit with IO,
8. data register DR for effecting word to byte conversion,
9. IO address register IOAR for storing IO address and making comparison of the IO address,
10. byte counter BC to be used in the word to byte conversion,
11. adder $ADD_1$ for renewing the conttent of the byte counter DC, and
12. latch register L for temporarily storing the result of the arithmetic operation.

The operation of the data channel will be explained by referring to FIG. 4.

The operation of data channel DCH may be subclassified as start control, transfer control and termination control.

The start control is started by the receipt of input-output instruction from the central control unit CC in a channel multiplexer CHM. This instruction is stored in an instruction register IR. The channel multiplexer CHM reads out the instruction from the main memory MEM and sets the channel command word CCW corresponding to the equipment number of the data channel DCH into IC memory and starts IO device designated by the channel command word CCW via sub-channel SCH. Normality of the starting operation is received via the sub-channel SCH and the normality and operation mode in the data channel DCH are combined and set into condition code CDC and then sends back them to the central control unit CC. The central control unit CC discontinues the operation and being placed in a waiting condition after sending the input-output instruction until the receipt of the condition code CDC, but after the receipt of the condition code CDC the connection control of the data channel DCH is interrupted and CC initiates another operation and the data channel DCH autonomously commences input-output operation.

Thus started IO sends out transfer request signal to the data channel DCH at the completion of transfer preparation and the transfer control is started. The transfer control, at the time of transfer of data from the main memory MEM to IO is made in word unit and being read out by the data buffer DB. The data is transferred to data register DR and is further transferred from the data register DR to IO buffer IOB in 1 byte unit by the byte counter BC. The data is sent from IO buffer IOB to IO of which address is designated by IO address register IOAR. On the other hand, when the date is to be read in the main memory MEM from the IO, the flow of data is made in reversal way. The word of transfer is controlled in the designated way by subtracting word counter in the channel command word CCW by the adder ADD and at the same time the address of the main memory MEM is renewed and is read out for controlling writing area. The IO address register IOAR checks whether or not only the designated IO is accurately functionning among a number of IO devices.

When the data of designated words are transferred, the termination control is started and the data channel DCH indicates termination indication with the IO. The IO by the above designation terminates input-output operation and supplies termination report to the data channel DCH. The data channel DCH, upon receipt of this report, originates interruption with the central control unit CC and completes termination report.

IV Main Memory Devices MEM

The main memory devices MEM consists of a number of independent main memory devices MEM. Each main memory device MEM is a random access memory comprising direct peripheral portion including incoming information section, normal operation section, and core stack and further comprising maintenance control test section and an outgoing information section.

Figure 5:
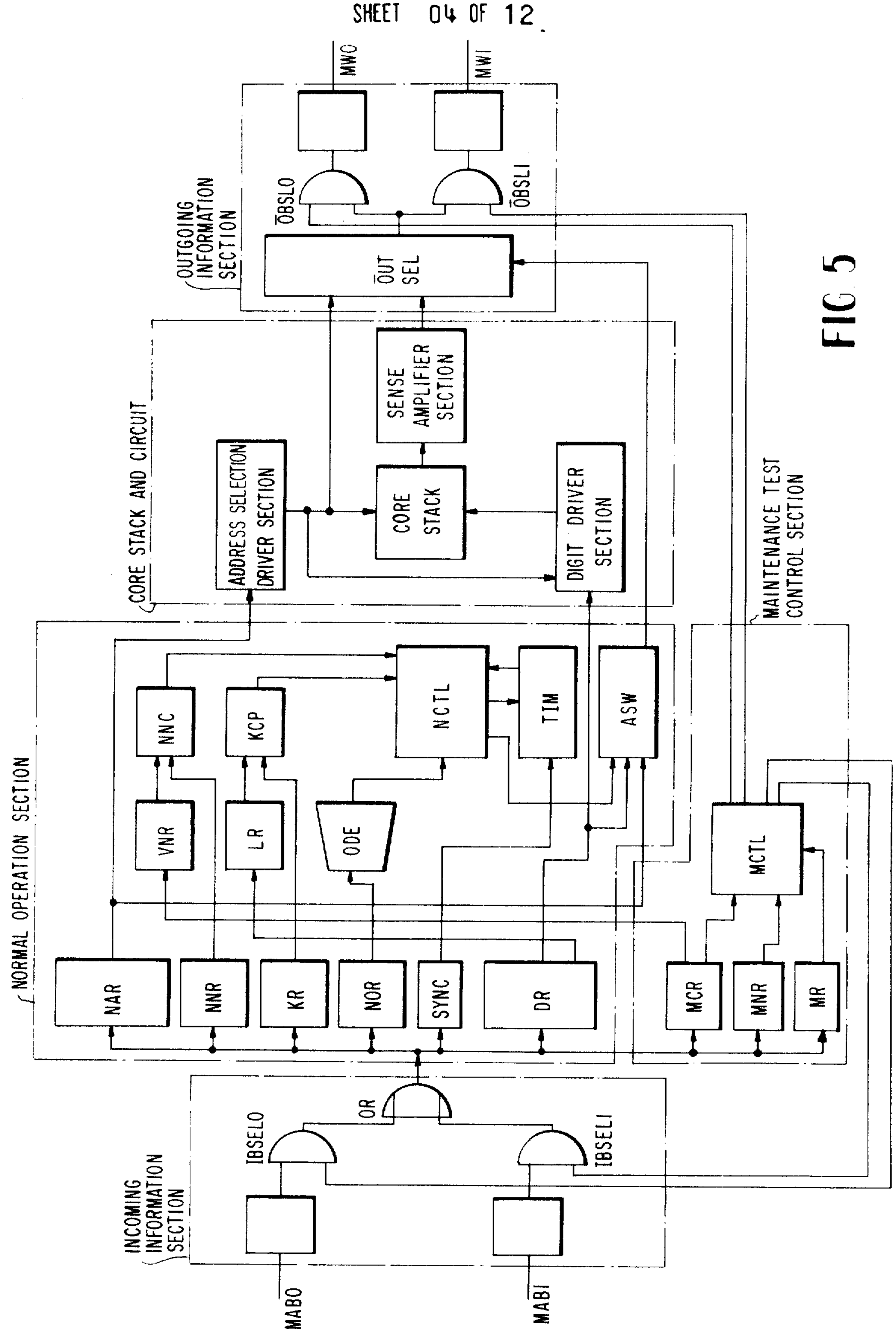

FIG. 5 shows a block diagram of an embodiment of an independent main memory device MEM.

The main memory device MEM operates under an instruction of the central control unit CC.

The main memory device MEM is volatile read out type memory being read out and write in in a certain time cycle by an access from the central control unit CC.

Further detail of each block in FIG. 5 will be explained.

The incoming information section comprises bus selection gate IBSEL0, IBSEL1 for selecting either one of the two memory address buses at a time of reception of the transfer information from the central control unit CC via memory address bus MABO or memory address bus MEB1 and an OR circuit ŌR.

The normal operation section comprises the following registers and circuits for storing the instruction from the central control unit CC.

1. Synchronous register SYNC for storing synchornous information for starting the timing circuit TIM for initiating memory timing cycle.
2. Normal order register NOR, address register AR and order decoder ODE for originating control signal for controlling the core stack and its circuit.
3. Key register KR for protecting the memory content.
4. Normal name register NNR for designating one of the independent main memory devices.
5. Data register DR for storing data at the time of write in.
6. Timing circuit TIM for delivering timing for proceeding the operation of each section in the given sequence.
7. Key compare circuit KCP for comparing key information at a time of writing in.
8. Normal name check circuit NNC for comparing the content of normal name register NNR and the content of the variable name register VNR.
9. All seems well circuit ASW for inspecting normality of operation.
10. Variable name register VNR for rewriting designated number of the device according to the program.
11. Lock register LR for storing key for protecting memory at each $2^N$ word of the memory.
12. Normal control circuit NCTL for checking normality of writing in the memory, reading out from the memory.

The outgoing information section comprises outgoing information selection circuit ŌUTSEL for selecting transfer information such as signal from ASW and reading out data, etc., and a selection gate ŌBSEL0, ŌBSEL1 for selecting memory answer bus MWB0 and MWB1.

Core stack and its circuit comprise core stack and related circuit such as driver for reading out and writing in. As the construction of these devices is well known, further detailed explanation may be omitted.

Maintenance test control section comprises memory control register MCR for storing information for maintenance operation, maintenance name register for memorizing number of maintenance devices, maintenance register MR for storing information for designating maintenance operation and maintenance control NCTL for selection control of the maintenance operation and the buses.

The main memory device MEM introduces the information from the central control unit CC sent through memory address bus into various registers via bus gate $IBSEL_0$ or $IBSEL_1$ and an OR gate OR designated by maintenance control MCTL. The various registers are normal address register NAR, normal name register NNR, key register KR, normal order register NOR, synchronous register SYNC, data register DR, maintenance register control MCR, maintenance name register MNR and maintenance register MR.

If the content of normal name register NNR and that of variable name register coincide with each other in normal check circuit NNC, then the normal control circuit NCTL is started. The normal control circuit NCTL reads out the instruction for writing in and reading out in the normal order register NOR by order decoder ODE and distributes controlling signal for initiating aforementioned instruction operation in the timing of timing circuit TIM started by the synchronous information.

In the reading out operation, the read out information from the core stack and its circuit is selected by the outgoing information selection circuit OUTSEL and sent to the central control unit CC either from memory answer bus $MWB_0$ or $MWB_1$ via selection gate OBSEL0 and OBSEL1 under control of the maintenance control circuit MCTL.

In the writing operation, the content of key register KR and already stored content of the lock register LR are compared in the key compare circuit KC and when the coincidence is confirmed, the normal control circuit NCTL is started and the content of the data register DR is stored in the memory according to the address of the normal address register NAR. When there is no abnormal condition located, the all seems well signal is transferred from the all seems well circuit ASW. On the other hand, in the maintenace operation the maintenance control MCTL is started when the content of the maintenance register MR is "1" and according to designation of the maintenance control register MCR control of memory address bus, control of memory answer bus and rewriting of variable name register VNR are effected. In this occasion, the coincidence of the content of the maintenance name register MNR and the content of normal name register NNR is required to be identified by the maintenance control circuit MCTL. (V) Magnetic Drum Memory MDC, MDU The magnetic drum memory consists of a magnetic drum controller MDC and a magnetic drum unit MDU. This magnetic drum memory is a large capacity drum memory of floating head type having its memory capacity 848 K words.

Figure 6:
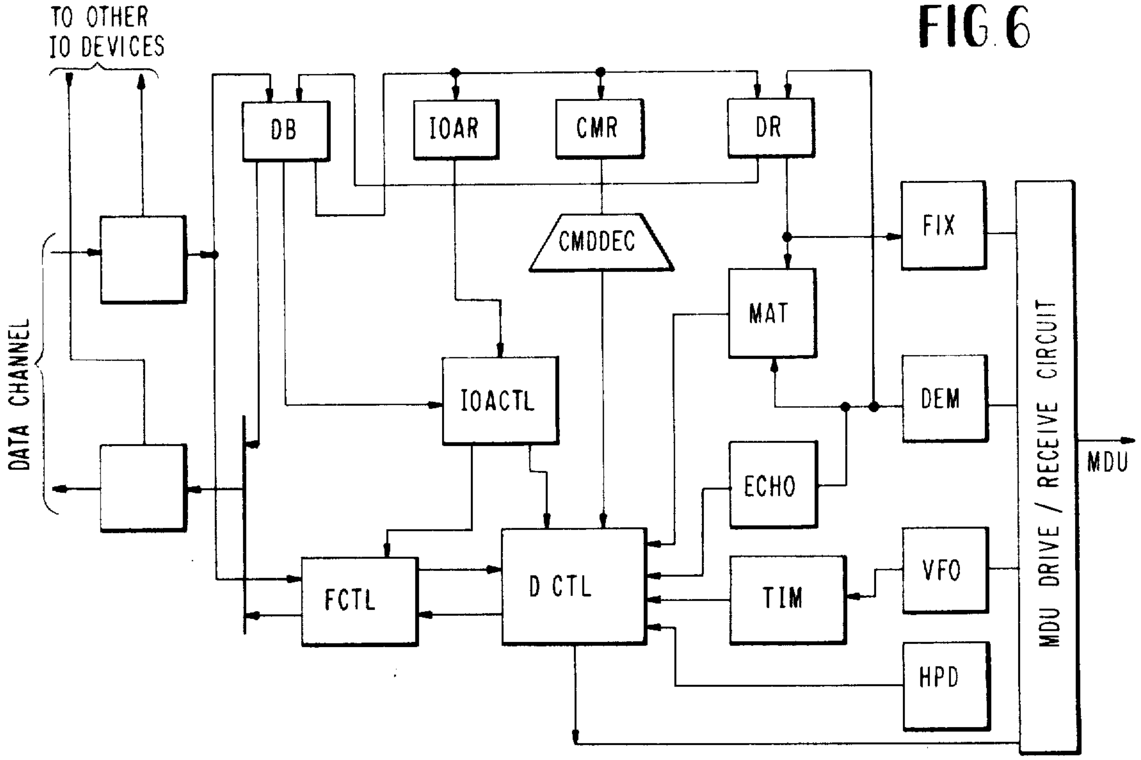
Figure 7:
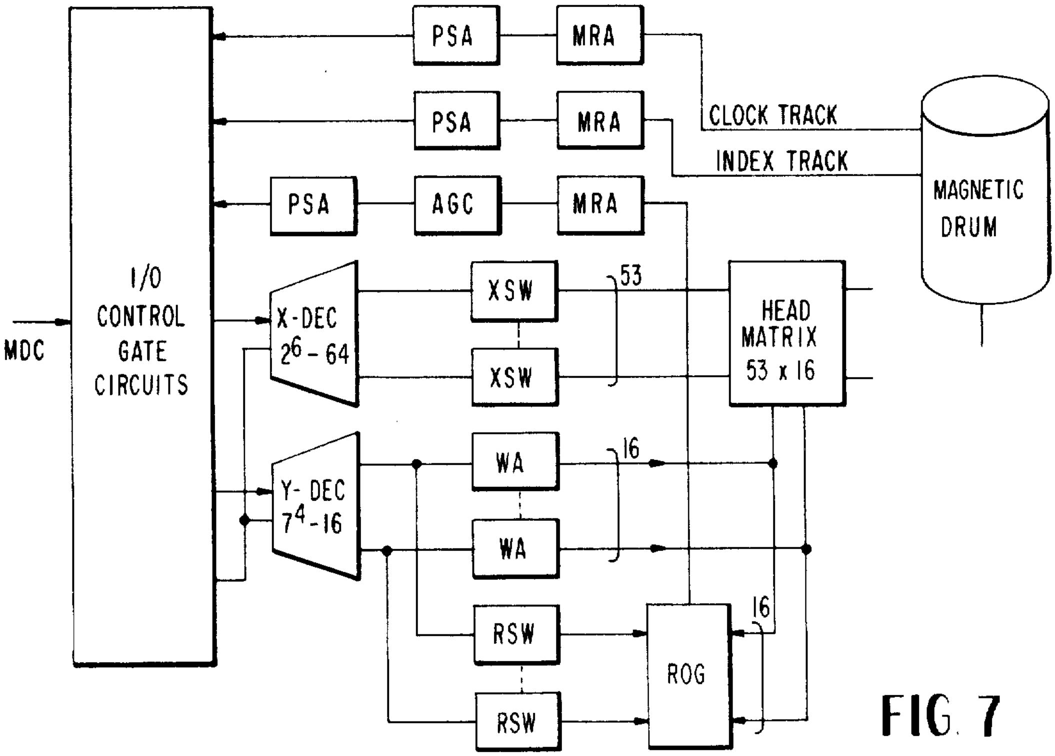

In the illustrated embodiment in FIGS. 6 and 7, the magnetic drum controller MDC reciprocates the information between the data channel in the byte unit information at the transferring speed of 270 KB/S and controls information check in the magnetic drum system and reproduction of information record having 4 bytes as one word unit.

The magnetic drum unit MDU having its feature that average access time of 10 MS, 840 tracks (1 track 1024 words) as shown in FIG. 6. The magnetic drum control MDC comprises the following circuits.

1. Interface controller FCTL for controlling interface signal between channels.
2. Data buffer DB to be used at a time of data transfer between data channels.
3. MDU drive-receive circuit for the interface with magnetic drum unit MDU.
4. Command register CMR for storing command code and its decoder CMDEC.

5. IO address register IOAR for storing magnetic drum address at the start of magnetic drum controller.
5. IO address controller IOACTL for effecting control with respect to device addresses at time for coupling the magnetic drum controller and the magnetic drum unit.
7. Data register DR for making series parallel conversion of the information between the data buffer DB and the magnetic drum unit MDU.
8. Fix pattern generator FIX for adding stable information and drum parity for the transferring information to the magnetic drum unit.
9. Matcher MAT for making comparison and identifying coincidence of the read out information from the magnetic drum unit with the content of the data register DR.
10. Home position detector HPD for detecting home position from the index track.
11. Timing circuit TIM for establishing timing by the content of clock-track from the magnetic drum unit.
12. Variable frequency oscillation VFO for generating 8 times higher harmonic pulses synchronizing with the drum clock.
13. Demodulator DEM for reproducing read out information by means of variable frequency oscillator VFO and timing circuit TIM.
14. Drum control DCTL for controlling start of command, transfer and report of the same.
15. Echo check circuit ECHO for making collation between the write in information, track selecting information and echo signal.

The magnetic drum unit MDU comprises IO control gate circuit, magnetic drum and related known circuit as shown in FIG. 7.

IO address is sent from the central control unit CC to the magnetic drum controller MDC via data channel. The magnetic drum controller MDC at the receipt of the above IO address stores its data buffer DB and initiates operation at a time of selection of its device by IO address control IOACTL by starting interface control FCTL. Furthermore, under control of the interface control FCTL the content of data buffer DB is transferred into IO address register IOAR.

Then, at a receipt of command from the data channel the content is transferred into command register CMR via data buffer DB and record it in command decoder and starts the drum control DCTL. According to the result, the drum control DCTL sends out the combination designation clock to the magnetic drum unit MDU via magnetic drum unit drive/receive circuit and the coupling is completed. The magnetic drum unit MDU transfers the information on the magnetic drum surface in clock track and in index track to the magnetic drum controller MDC via read amplifier MRA, peak sense amplifier PSA and IO control gate circuit. The magnetic drum controller MDC receives the information in magnetic drum unit drive/receive circuit and places it in pull-in condition by variable frequency oscillator VFO and starts timing circuit TIM. The timing circuit TIM further starts drum controller DCTL.

After coupling, the control data including location information from data channel is received by data buffer DB and is transferred into data register DR under control of the timing circuit TIM. In this occasion, the data are converted from byte unit to word unit. Then, the content of data register is transferred into magnetic drum unit MDU via MDU drive/receive circuit. As a result, the magnetic drum unit MDU stores the information IO control gate circuit for selecting track address and returns the same information. This is confirmed by an echo circuit. In the magnetic drum unit MDU, the following operations are made independently. By track address information, X decoder XDEC, Y decoder YDEC, X switch circuit XSW, read out switch RSW are started and head matrix is operated. In the magnetic drum controller MDC, the location address stored in the data register DR and index track information sent from the magnetic drum unit MDU are compared in the matcher MAT. After comparison, if coincidence is detected, a request is sent to the data channel to operate the drum control DCTL and to commence transfer operation.

In the writing in operation, the data from the data channel is sent via data buffer DB and the data register DR to the magnetic drum unit MDU and on its magnetic surface via fix pattern generator FIX for adding fixed information on the magnetic surface on the drum unit. The magnetic drum unit records the information in the magnetic drum via IO control gate circuit, XY decoders XDEC and YDEC by write amplifier WA. Then, in the reading operation, the track name is read by read out gate ROG, read amplifier MRA, automatic gain control circuit, peak sense amplifier PSA, IO control gate circuit and sent it to the magnetic drum control MDC. On the other hand, in the magnetic drum controller MDC the information is demodulated by the demodulator DEM and made series parallel conversion in data register and sent to data channel via data buffer DB. The termination condition of the operation is found at a time of delivery of termination condition signal from data channel and of a definite information from index track of the magnetic drum unit namely at a time of detection at last address home position by home position detector.

VI Common Channel Signaling Equipment CSE

Figure 8:
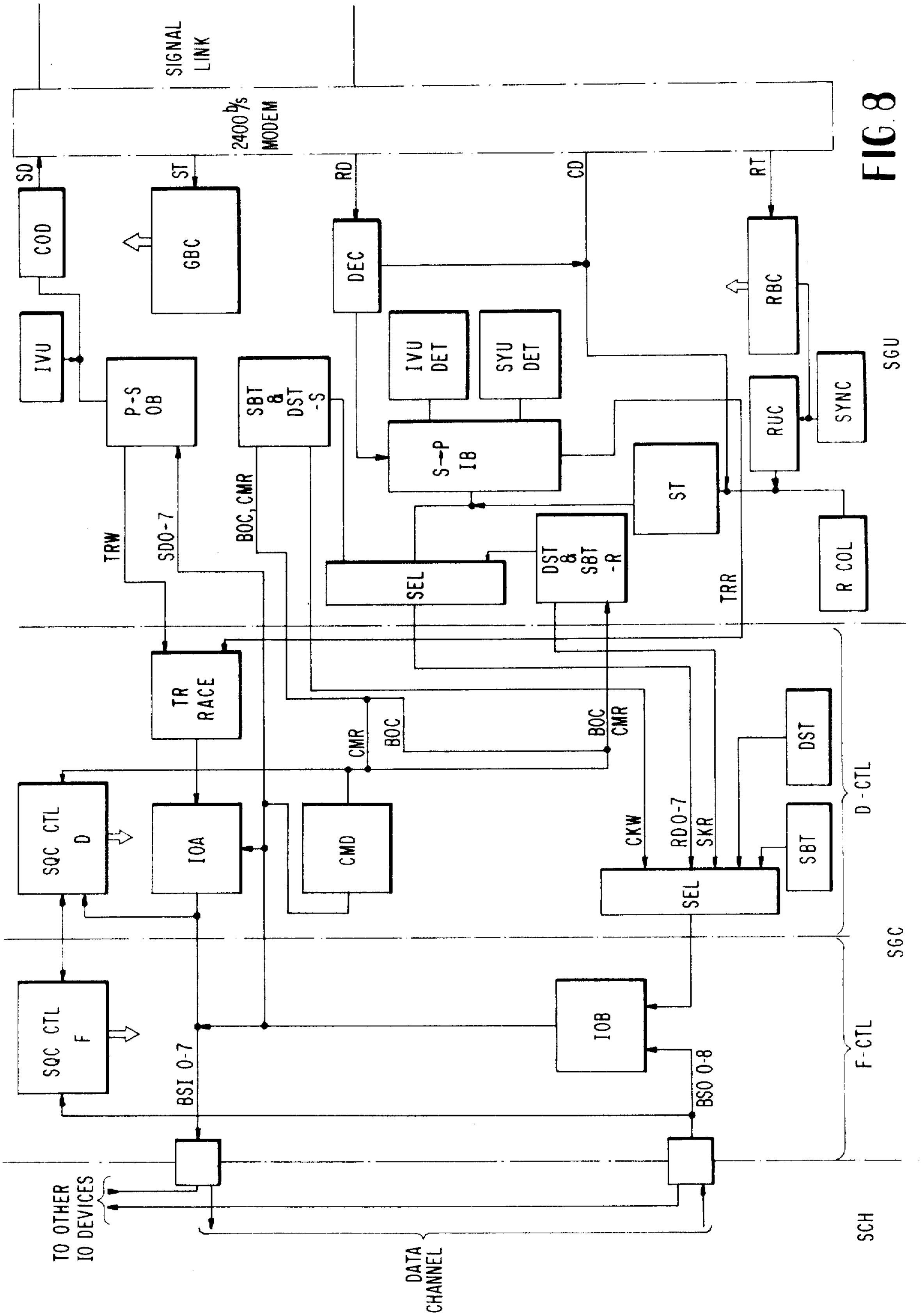

FIGS. 8A and 8B show block diagrams of a common channel signaling controller SGC and a common channel signaling unit SGU for constructing a common channel signaling equipment CSE according to the present invention.

The signaling controller SGC is a device for distributing the data sent from the sub-channel SCH to the signaling unit SGU, for receiving and programming the data and status from each SGU, and for transferring the thus received and arranged data and status to the sub-channel SCH, and it is an interface device between the signaling unit SGU having an intrinsic interface as an IO device and the sub-channel SCH having a standarized interface. The signaling unit SGU is a device for delivering a request of transmission to the signaling controller SGC in case of transmission, sending a transmitted data transmitted from the signaling controller SGC to MODEM after converted it from parallel to serial, converting a receiving data from MODEM from serial to parallel in case of reception, and transmitting the data by sending a request of reception to the signaling controller SGC.

The signaling controller SGC substantially consists of two sections, that is:

1. Interface controlling section F-CTL and
2. Device controlling section D-CTL.

The interface controlling section F-CTL further consists of the following circuits.

1. Input-output buffer register IOB for temporarily storing a transmitted data by 1 word at a byte unit,
2. Interface sequence control circuit SQCCTL-F for controlling transmission of the data to the sub-channel.

The device controlling section D-CTL further consists of the following circuits.

3. IO address register IOA for storing the IO address which particularly designates the signaling unit SGU,
4. command register CMD for storing the command which defines the action of the signaling unit,
5. transfer request racing circuit TR RACE for determing whether a request of transmission or a request of reception is received,
6. device status circuit DST for forming the device status,
7. sense byte circuit SBT for forming the sense byte showing the condition in the device,
8. selector SEL for carrying out selection of receiving informations,
9. device sequence control circuit SQC CTL-D for controlling data transmission to the signalling unit SGU.

The signaling unit SGU further consists of the following circuits.

10. Output buffer P → S OB for temporarily storing the information transmitted from the signaling controller SGC and converting it from parallel → serial,
11. Coder COD for adding a cyclic check code to the signal from the output buffer P-S OB,
12. Decoder DEC for decoding and detecting the cyclic check code of the signal from MODEM,
13. Input buffer S → P IB for converting the receiving signal from MODEM from serial → parallel and temporarily storing it,
14. IVU circuit IVU for forming an invalid signal,
15. Sending device status & sense byte circuit SBT&DST-S for forming the device status and sense byte in case of transmission,
16. IVU detector IVU DET for detecting the IVU signal from the receiving information from MODEM,
17. SYU detector SYU DET for detecting the SYU signal from the receiving information from MODEM,
18. Signal status circuit ST for forming the status of the receiving signal,
19. Receving device status & sense byte circuit DST&SBT-R for forming the device status and sense byte in case of reception,
20. Synchronization control circuit SYNC for controlling the unit synchronism,
21. Receiving unit counter RUC for counting the signal unit received,
22. Receiving unit collision circuit RCOL for detecting collision of the receiving unit,
23. Sending bit counter GBC for receiving a transmission timing signal from MODEM and forming and distributing the necessary timing signal to the transmission side circuit,
24. Receiving bit counter RBC for receiving a reception timing signal from MODEM and forming and distributing the necessary timing signal to the reception side circuit, and
25. 2400 b/s MODEM for carrying out 4-phase modulation and demodulation.

In case of transmitting the data between the sub-channel SCH and the signaling unit SGU, the IO address for designating the special signaling unit SGU is firstly sent from the sub-channel SCH to the IO address buffer register IOA and stored therein. Then, the command for designating the action of the signaling unit SGU is transmitted from the sub-channel SCH to the command register CMD and stored therein, and the state of the signaling unit SGU is transmitted as a device status to the sub-channel SCH through the device status circuit DST, the selector SEC, and the input-output buffer register IOB. Thus, starting is completed. Next, a request of connection with the sub-channel SCH is sent to the sub-channel SCH from the signaling controller SGC, and so as to enter into the transmission action. In case of transmission, an information from the sub-channel SCH to the signaling unit SGU is transmitted to the signaling unit SGU through the input-output buffer register IOB by 1 word at every 8 bit, and conversion of parallel → serial is carried out with the output buffer P → S OB of the signaling unit SGU, then the information is sent to the signaling link by adding the cyclic check code from MODEM by means of the coder COD. When the output buffer P → S OB becomes empty, a request of transmission for requesting the next data transmission is sent to the signaling controller SG and the next data of 8 bits is transmitted. In case of reception, the data from MODEM is decoded by the decoder DEC, and the cyclic check code is checked, while the data is series parallel converted with the input buffer and a request of reception is sent to the signaling controller SGC. At the signaling controller SGC, a request of reception is received by the transfer request racing circuit TR RACE, an information from the signaling unit SGU to the sub-channel SCH is stored in the input-output buffer register IOB by 1 word after passing through the selector SEL by 8 bits, and the thus stored information is transmitted to the sub-channel SCH by 8 bits.

After completed the transmission operation, instruction of completion is sent from the sub-channel SCH and a result is reported from the signaling controller SGC.

VII Communication Control Unit CCU and Digital Converter LUT:

The communication control unit CCU and the digital converter LUT receive serial message data from the data terminal unit or computer connected to a telephone network and forms the data into a character and at the same time function error check, and sequence check and transfer the data into the main memory device MEM under control of the data channel device DCH. Also, these devices transfer the message data stored in the main memory device MEM into the line.

Figure 9:
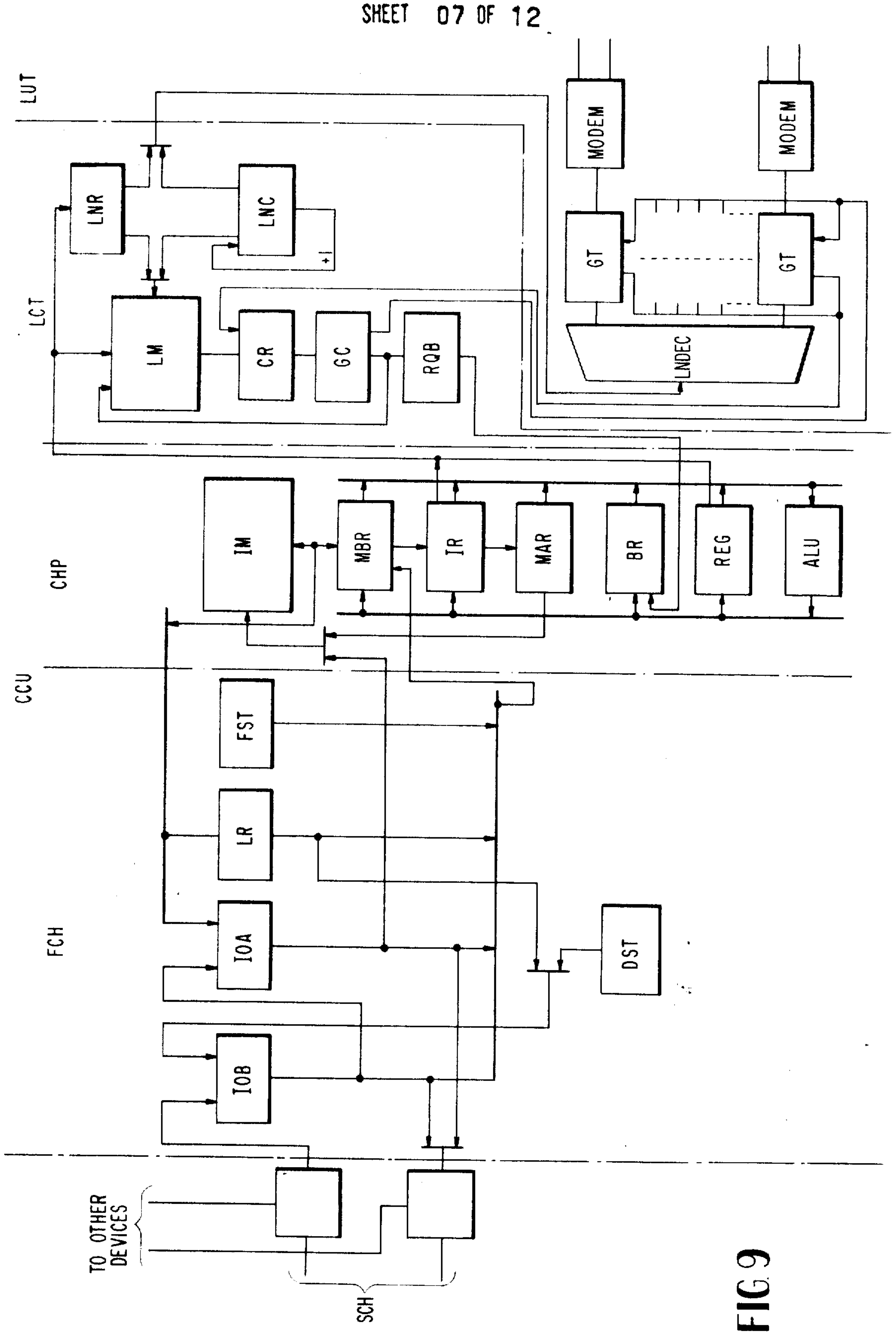
Figure 10:
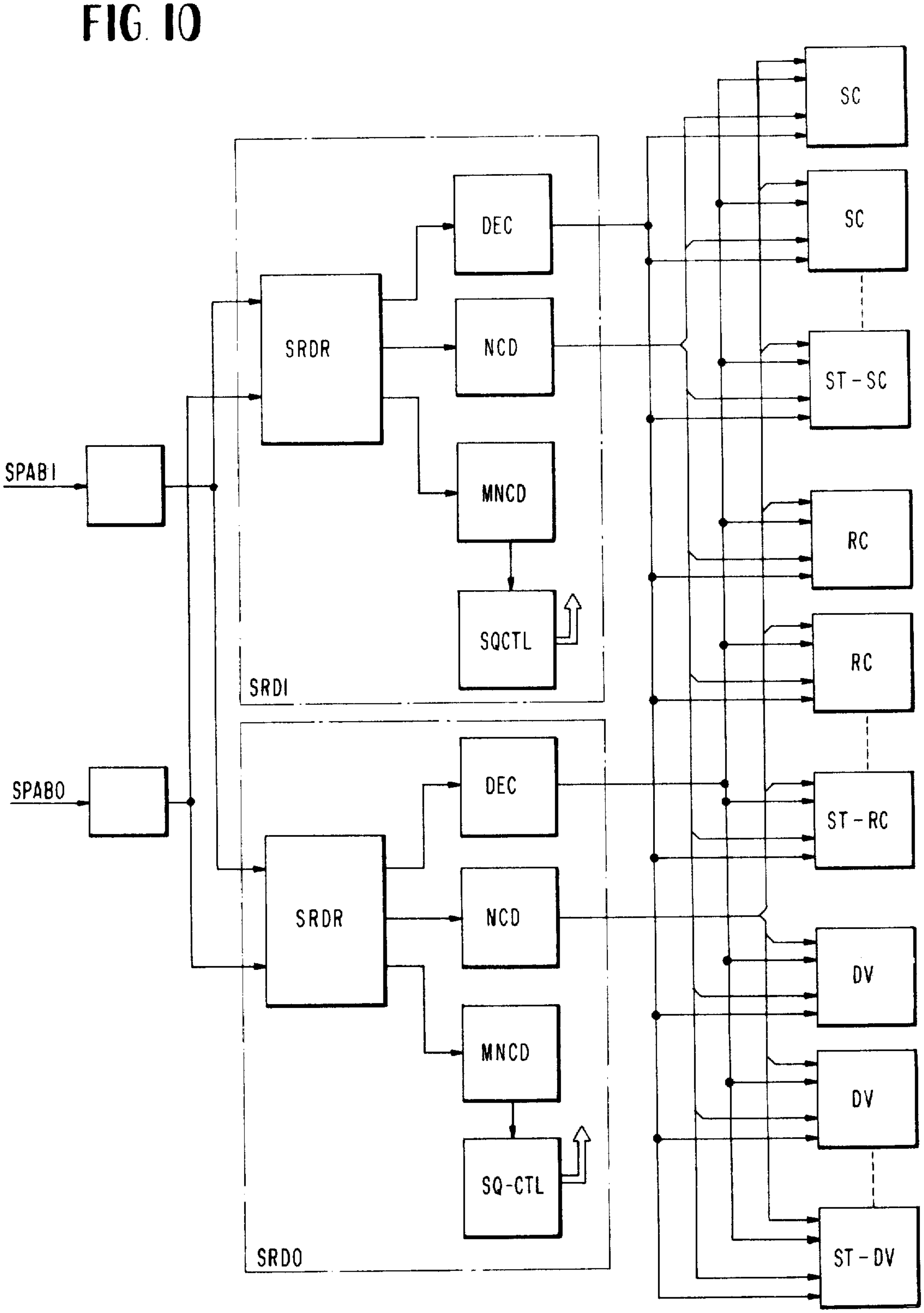
Figure 11:
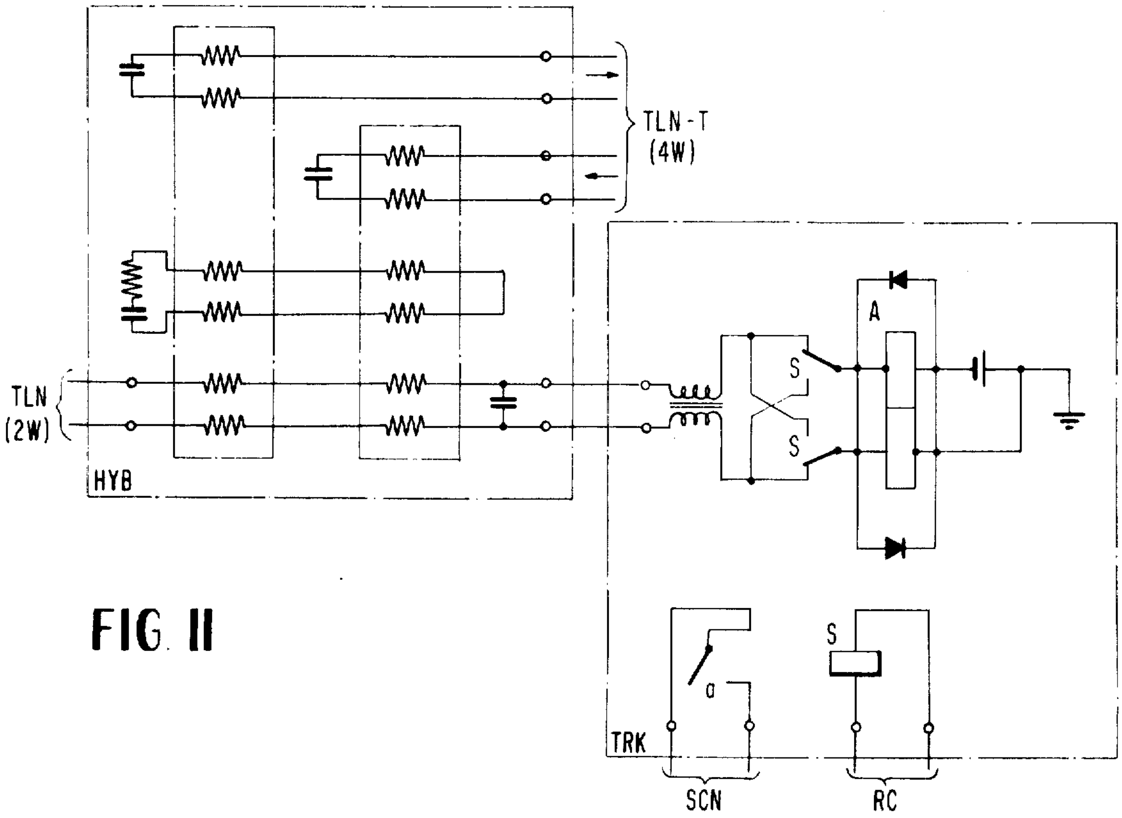
Figure 12:
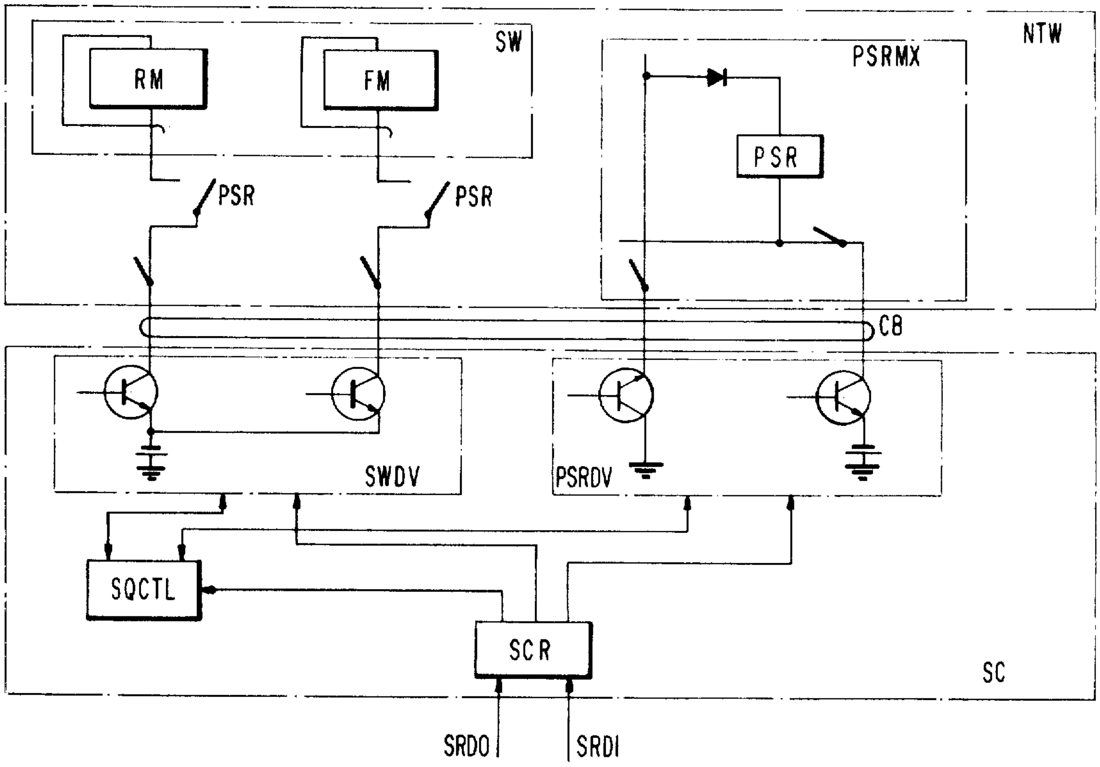

The communication control unit CCU comprises as shown in FIG. 9, an interface channel FCH for making interface control with the sub-channel SCH, a character processor PCH, which is a kind of compact type computer for effecting error check and sequence check of data, and a line control LCT for effecting combination or separation of character in a message.

The construction of the communication control unit CCU and the digital converter LUT will be shown below. Interface Channel FCH:

1. IO buffer register IOB for reciprocating data with the sub-channel SCH.
2. IO address register IOA for storing IO device address (in this case corresponding to the line number).
3. Latch register LR for storing read-out data from character processor CHP.
4. Interface status register FST for indicating operation condition of the interface with sub-channel SCH.
5. Device status register DST for indicating condition of CCU in the interface control with SCH. Character Processor CHP.
6. Internal memory IM for memorizing controlling program and information.
7. Instruction register IR for storing instruction.
8. Memory address register MAR for storing address of internal memory IM.
9 . Memory buffer register MBR for reading out and writing in data in IM.
10. Buffer register BR for receiving data from line control LCT.
11. General register REG used in arithmetic operation.
12. Arithmetic logic unit ALU for effecting arithmetic operation. Line Control LCT:
13. Line memory LM for memorizing information to be used combination and separation of character in message data.
14. Control register CR for reading out combination, separation, information of character from LM.
15. Gate control circuit GC for controlling combination and separation of character.
16. Line number register LNR for storing line number.
17. Request queue buffer register RQB for storing combined character and line number corresponding thereto.
18. Line number counter LNC for autonomously counting up line number. Digital Converter LUT:
19. Line decoder LNDEC for designating line by decoding line number.
20. Gate circuit GT for gating out the message data according to designation of the line decoder LNDEC.
21. Modulator-demodulator MODEM for making conversion between alternating signal on the line and DC logic level signal.

Explanation will be given considering the case that a message data is read out from a line.

The sub-channel SCH stores IO address corresponding to the line into IO buffer register IOA after executing predetermined start sequence. The IO address is stored in the predetermined area of the internal memory IM together with the command read. At the same time, in the interface status register FST a bit designating start is indicated and making an interruption in character processor CHP. The character processor CHP effects interruption analysis by using its inner program and identify start of a line and making translation of IO address into line number which is written in line memory LM. The line memory LM comprises assembly buffer for combining and separating character and information area for defining operation for respective line. By an autonomous operation of line number counter LNC the line number corresponding to respective line is successively read out from the line memory LM and gate circuits corresponding to respective line are opened by the line number decoder LNDEC. At the same time, the control information for corresponding line in the line memory LM is read out by control register CR and by this information the gate control circuit GC operates and the message data from gate circuit GT is read in assembly buffer in line memory LM and at the time of 8 bit corresponding to 1 character this character and the line number are stored in request queue buffer register RQB.

The character processor CHP periodically scanned the request queue buffer register RQB and read in the information in the RQB in general register REG via buffer register BR the character processor CHP makes error check and discrimination of transmission control character for the data read in by arithmetic operation of the arithmetic logic unit ALU. Thereafter, CHP stores the data in the predetermined area of internal memory IM and originates transfer request against the interface channel FCH.

The interface channel FCH read out the data from internal memory IM and also IO address and stores in the latch register LR AND IO address register, respectively, and thereafter, transfers into sub-channel SCH.

The write operation for sending the data into the line is substantially the same as read operation, but trigger of transfer request of the character is made by request queue buffer register RQB. Namely, character separation is made by assembly buffer line memory LM and after the termination of its sending a flag indicating transfer request is marked in the RQB and this flag is read by character processor CHP.

VIII Speech Path Equipment:

Speech path equipment will be explained by referring to FIGS. 2, 10, 11 and 12.

The speech path equipment is to function the settlement of speech path and signaling path. The device comprises necessary speech path driving equipment, scanner, relay driving equipment, and signal receiver distributor for controlling interface with the central control unit CC.

The speech path equipment comprises essentially the following devices.

1. Line link network LLN mainly accommodating telephone subscribers with speech path and signal path,
2. Trunks for feeding speech current and making supervision of the speech,
3. Trunk line network TLN, TLN-T (4 wire) accommodating the trunks,
4. Hybrid coil HYB for the connection of 2 wires and 4 wires,
5. Scanner SCN for supervising conditions of the speech and signal,
6. Scanner driver DV for driving the scanner SCN, and standby driver ST-DV,
7. Switch controller SC for driving line link network LNN and trunk line network TLN, TLN-T and standby switch controller STSC,
8. Relay controller RC for controlling relays used in trunk TRK, etc., and standby relay controller ST-RC,
9. Signal receiver and distributor SRD for effecting decode of binary information sent from the central control unit CC via speech path address bus SPAB and conversion into 1/n code and transferring these information into driver DV for scanner SCN, standbly driver STDV, switch controller SC, standby switch controller ST-SC, relay controller RC, standby relay controller ST-RC, 10. Speech path answer bus SPWB for returning result of scanning of the scanner SCN into the central control unit CC, speech path address bus SPAB, speech path answer bus SPWB and signal receiver and distributor SRD are made in duplicated construction and each duplicated unit is indicated by suffixes 0 and 1, 11. Main name code decoder MNCD for receiving information from the speech path address bus SPAB and for temporary storing information in the signal receiver and distributer register SRDR and making a judgement of the information whether it is designated to the signal receiver and distributer SRD, sequence controller SQCTL, decoder DEC for making decoding of the received necessary information from binary code to 1/n code when the signal is judged to be designated to its own circuit, name code decoder NCD for designating switch controller, and sequence controlling circuit for controlling a series of sequence operation, 12. The hybrid coil HYB to be used in the connection between the line link network LLN and trunk link network TLN-T and speech current feed and speech supervision relay A and relay S controlled from the relay controller RC for reversing current polarity of the speech wire and the contact a of the relay A are accommodated in scanner SCN.

13. Swich driver circuit SWDV for driving switches forming the networks, i.e., line link network LLN and trunk line network TLN. This switch driver circuit SWDV drives path selection relay PSR arranged in matrix form by its switch controller register SCR storing signals from the signal receiver and distributer SRD and its sequence controller circuit SQCTL for controlling each sequence in the switch controller SC and the path selection relay driver PSRDV. Thereafter, the predetermined electromagnets are driven by means of stored signal in the switch driving register SCR by transferring wires of reset magnet for the switch to be driven a finger magnet FM into the switch controller SC by inter-rack cable and by the contacts of path selection relay PSR.

The binary information from the central control unit CC is stored in the signal receiving and distributing register SRDR in the signal receiving and distributing device SRD via speech path address bus SPAB. If the data is judged to be not for the start of the own equipment by means of main device number distributing circuit MNCD, then the sequence control circuit SQCTL resets the content of the signal receiving and distributing register SRBR and await next instruction from the central control unit CC. If the data are judged to be addressed to the own equipment, it is decided that which switch controller SC, which relay controler RC or which scanner SCM are to be operated by device number controlling circuit NCD (at the same time only one device can be designated). The necessary information for the operation of designated device is made conversion from the binary code into 1/n code by decoding circuit DEC and the information is transferred to the equipment. These controls are made inner predetermined period and the signal receiving and distributing register is reset for the content and await next instruction. For the explanation purpose a case is considered in which a device number decoding circuit NCD is designated by a switch controller SC. In this case, the signal from the signal receiving and distributing device SRD is sent by switch controller register SCR in the switch controller SC via decoding circuit DEC after making binary to 1/n conversion. Switch controller SC decodes this information and operates path selecting relay provided for respective switch SW and arranged matrix PSRMX shape. Via contact PSR of the path selecting relay PSR and connect controlling wire of reset magnet RM and finger magnetic FM of the switch SW to be operated into the switch controller and according to the aforementioned information the switch driver circuit SWDW effects to drive to open and closure of the contact of the switch SW. These control in a certain sequence controlled by sequence control circuit SQCTL. In the time of normal operation content of switch controller register SCR is reset and wait next start from the signal receiving and distributing device SRD.

Spare device for switch controller SC, relay controller RC, and scanner driver DV is provided one device for respective device. At the time of ocurrence of fault the device is switched to the standby device and to maintain normal operation of the switching. These devices are equipped at a concentrated location separate from the controlling object and inter-rack cable CB are used for the connection of the devices.

Figure 13:
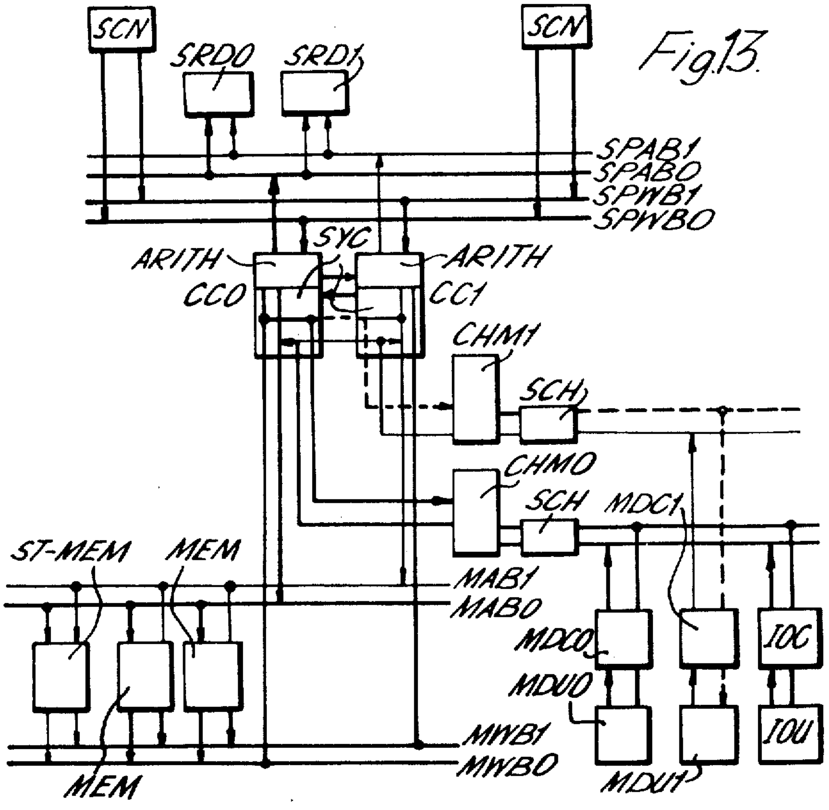
FIG. 13 is a diagram showing a partial of FIG. 2 in detail and more particularly illustrating transfer routes of the information signals in the system.

Flow of information in an embodiment of the present invention will now be explained. FIG. 13 shows the flow of information by bold lines when the central control units $CC_0$ and $CC_1$ are operating in synchronism. In the synchronized operation both units $CC_0$ and $CC_1$ receive identical instruction and identical input data and perform the instructed process and take matching of the result of performance between both units CC once per one instruction in order to obtain high reliability of the information process and an early detection of fault in the units CC. In the synchronized mode of operation, one of the units CC, for instance $CC_0$ is made the master controlling unit and the other unit $CC_1$ is made the slave unit and the information for other devices is sent from the master unit $CC_0$. Both the central control units CC receive identical information from the main memory device MEM via memory answer buses $MWB_0$, $MWB_1$ and from the speech path devices via speech path answer buses $SPWB_0$, $SPWB_1$ respectively.

An information from the magnetic drum device (MDC, MDU) or from the input-output device (IOC, IOU) is controlled by the data channel device (CHM, SCH) which has received the instruction to transfer data from the central control unit CC. The central control units CC are not concerned with the major process of transfer of the information during the transferring period, except that the unit CC comprises system controller SYC for controlling the direction of the information transfer flow. Therefore, information flowing between the main memory device MEM and the magnetic drum device (MDC, MDU) passes through the central control unit CC. Further detail of the system controller SYC will fully be explained with reference to FIG. 5 hereinafter. The block denoted as ARITH in the central control unit CC is an arithmetic unit which reads the instruction and performs arithmetic operations. The magnetic drum devices are duplicated for high reliability but the write-in times differ with respect to one another. Inorder to show such non-coincidence of the write-in time a part of write-in route to the magnetic drum device in the "1" system is shown by a broken line. The reason for the non-coincidence of the write-in time into the respective magnetic drum units is that synchronized operation of the magnetic drum device with the other devices is not possible since the clock in the magnetic drum unit is controlled by referring to the number of rotations of the magnetic drum unit and the rotating phase of the same. In other words, the clock is under control of the respective driving motor. The operation of such a system, as the magnetic drum unit, is referred to as the asynchronization mode and should be treated differently from the main memory devices of which the signal input and output are controlled by the clock from the central control unit CC.

In FIG. 13 the thin lines connecting various blocks are spare routes, i.e., information transmission routes used according to the need. The information transmission route can be switched or altered by means of route controlling flip-flop circuits provided at each branch point of the information transmission route. In order to simplify the diagram the route controlling flip-flop circuits are not shown in FIG. 13.

Figure 14A:
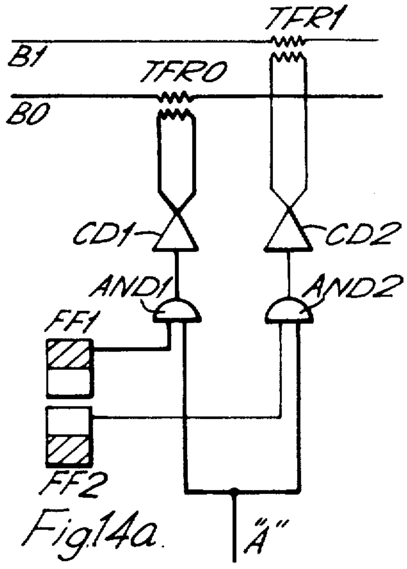
Figure 14B:
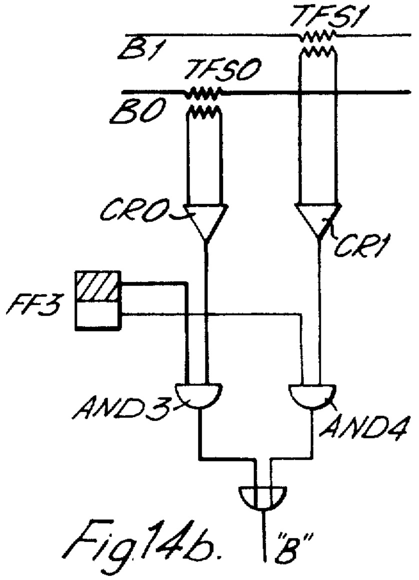

FIGS. 14a and 14b show embodiments of the possible circuit of such route controlling flip-flop circuit.

FIG. 14a illustrates that an information signal derived from device "A" is transferred to a signal bus $B_0$ by a flip-flop circuit $FF_1$ which is turned on at this time and via opened AND gate $AND_1$, a cable driver circuit $CD_1$ and a line transformer $TFR_0$, whereas the route to the other signal bus $B_1$ is prohibited by a flip-flop $FF_2$ which is then its off-condition. The cable driver circuit CD is a circuit to convert the gated dc logic signal to a high level ac signal and to send it out via the transformer to the cable bus. The device "A," not shown in FIG. 4a, may be, for instance, the central control unit $CC_0$ and the signal bus $B_0$ may be the memory address bus $MAB_0$. Such a route controlling flip-flop circuit is provided at each branch point on the memory address bus $MAB_0$, as for instance, at the branch point to each memory device MEM. The signal from the central control unit $CC_0$ is transferred to the memory device MEM in "0 " system when the system is operating normally. But, if the central control unit $CC_0$ becomes faulty the other unit $CC_1$ in the duplicated scheme takes the place of $CC_0$ and sends instruction signals to the memory device MEM via the spare information transmission route indicated by the thin line by operating the route controlling circuit at the branch point to the memory device MEM. If the device "A" in FIG. 14a is the main memory device MEM which should send out signal information to both the memory answer buses $MWB_0$ and $MWB_1$, both the flip-flop circuits $FF_1$ and $FF_2$ should be turned on.

FIG. 14b illustrates a case where a device "B" receives information signals from a signal bus $B_0$. In this case, by switching a flip-flop $FF_3$, the device "B" can receive the information signal from the bus $B_0$ via a transformer $TFS_0$, a signal receiver $CR_0$ and an AND gate $AND_3$. In this circuit only one flip-flop $FF_3$ is used since the device "B" receives information from either one of the buses $B_0$ or $B_1$.

FIG. 15 illustrates the information transmission routes the system controller SYC in the central control units CC. Bold lines connecting various parts show the information transferring routes between the main memory devices and the peripheral magnetic drum devices or the input-output devices, when the channel multiplexer $CHM_0$ of the data channel device is operating. The information read out from the memory answer bus $MWB_0$ is stored in a buffer memory register $MBR_0$ and fed to the channel multiplexer $CHM_0$ of the data channel via the gates 2 and 3. The information is not applied to the arithmetic unit $ARITH_0$ of the central control unit $CC_0$ since a gate 1 is closed. A gate 5 in the central control unit $CC_1$ is also closed to prohibit an input to the device $CHM_1$ of the other data channel. Bold broken lines show the information transferring routes for transferring information to input-output devices from the "1" system under the control of the data channel device $CHM_1$. This time the gate 5 is opened.

Data transfer from the data channel $CHM_0$ to the main memory device MEM is effected via memory control circuit $MCTL_0$ to the memory address bus $MAB_0$ by opening the gate 4. Reading out the memory contents from the main memory devices MEM into the arithmetic units ARITH of the central control units CC is effected by forming respective symmetrical operational routes from the memory answer buses $MWB_0$ and $MWB_1$ to the arithmetic units $ARITH_0$ and $ARITH_1$. RBR and WBR are the reading buffer register and writing buffer register respectively, required for effecting data matching between both the central control units CC and information interchanging between the system controllers SYC.

The switching system made in accordance with the present invention as shown in FIG. 2 can take different configurations of information transferring route by the control of the system controllers SYC in the units CC and the route controlling flip-flop circuit FF. These different system operations are generally termed as operational modes.

There is an operation mode termed as the separate operation mode in addition to the aforementioned synchronized operation mode.

FIGS. 16a – 16d show various redundancy configurations according to each operation mode in which the essential parts as shown in FIG. 2 are included.

Figure 16A:
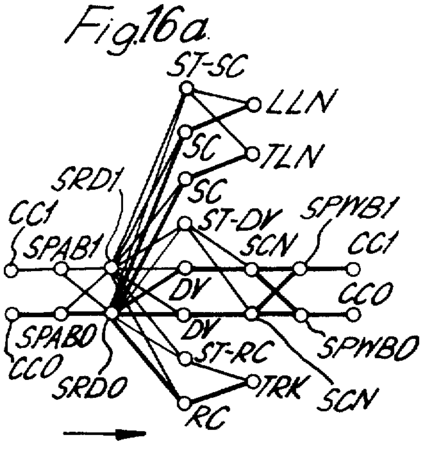

FIG. 16a shows the redundancy configuration of the speech path system in the synchronization operation mode. FIG. 16b shows the redundancy configuration of the central processor and input-output equipment of the system in the synchronization mode. In the above figures bold lines indicate information routes when the system is operating normally. The thin lines indicate spare information transmission routes when some parts of equipment in the system become faulty. The arrow mark at the bottom of the drawing indicates general direction for the flow of information.

Figure 16C:
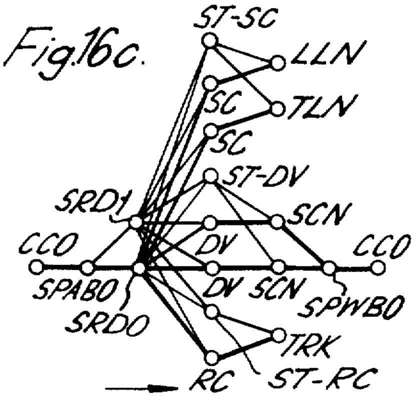
Figure 16B:
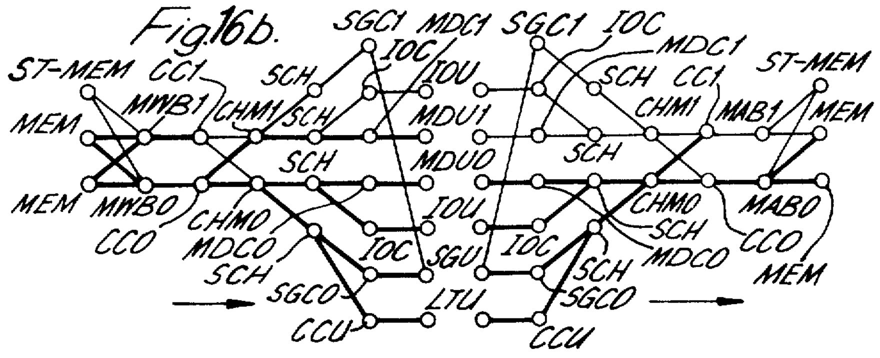
Figure 16D:
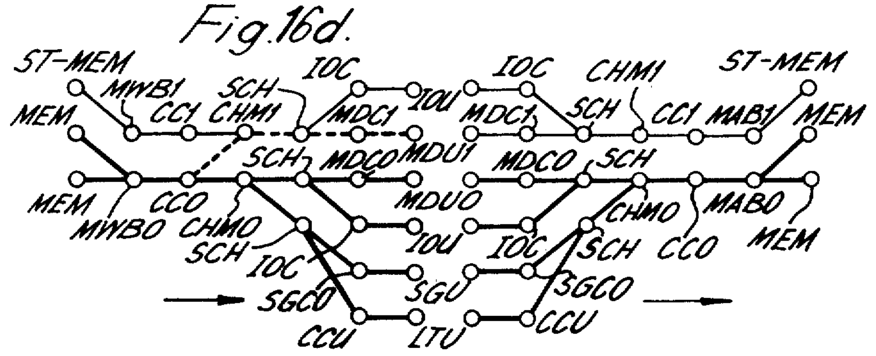

FIGS. 16c and 16d are the corresponding redundancy configuration of the system but in separate operation mode. What is termed as the separate operation mode is that the two central control units $CC_0$ and $CC_1$ function independently by referring individual programs and data from respective separate main memory devices.

In the separate mode of operation, the system is equivalent to a system comprising two processors, one of which is used for on-line jobs, such as telephone switching service and the other one is used for off-line processing, such as information processing not related to the direct switching operation. In FIG. 16d, the "0"

system equipments are assumed as on-line system and the "1" system equipments are assumed as off-line system. The on-line information transmission routes are indicated by bold lines and the off-line information transmission routes are indicated by thin lines. However, as far as the magnetic drum is concerned, the magnetic drum unit in the "1" system, i.e., $MDU_1$ is so arranged as to be written-in the copied information from the on-line memory equipment. Even in the separate mode operation, the information intercommunication is effected between the system controllers SYC in the central control units $CC_0$ and $CC_1$. Should a fault occur in an equipment in the on-line system, the operation of the off-line system is discontinued immediately and such necessary devices in the off-line system as the central control unit $CC_1$, ST-MEM, etc., are automatically switched into the on-line system. At an occasion of interruption of the off-line processing, the discontinued transit data is copied into the magnetic drum equipment to await future re-opening of the off-line processing. In the on-line system the necessary information for the re-establishment of the system is derived from the magnetic drum periodically written-in the storage area. In the separate mode of operation the central control units $CC_0$ and $CC_1$ are operated under mutual relation of master and slave devices. The central control unit $CC_1$ in the off-line system is so arranged as not to effect the operation mode of the on-line system even if a fault occurs in the off-line system of $CC_1$. This consideration is to secure a safety operation of the on-line system. However, if the off-line unit $CC_1$ is once switched into the on-line system due to a fault in the on-line system, the aforementioned master-slave relation between the both units CC is reversed and $CC_1$ is now operating as the master unit and $CC_0$ as the slave unit.

In the known duplicated system the data required for the re-establishment of the system is not stored in the system so that such separate operation mode of the system into "0" and "1" systems as the present invention will adversely affect for the on-line service. Accordingly, the utilization of the peripheral magnetic drum equipment for the backing up of the main memory will afford an advantage not only for the reduction of the main memory equipment but an additional merit for obtaining the separate mode of operation to carry out off-line processing.

A further advantage of the present invention, is the provision of the data channel equipment for obtaining a standard interface scheme with the input-output devices. With the introduction of the data channel equipment into the switching system, the central control units CC of the system can control another exchange system or a computer system by the interposition of the data channel via a high speed data link or a digital converter.

Now back to FIG. 2, the block denoted as SGU is a signal unit for common channel signalling system which is a kind of a data link and a block SGC is a signal controller used commonly with a plurality of the signal units SGU. The common channel signalling system is a system to transmit inter-office information signals for a great number of trunks, such as 1,500 circuits for instance, commonly over a single pair of high speed data link DLINK, instead of conventional signalling system using respective trunk circuit per each trunk. In this system the transmitted information is once stored in the main memory device and the necessary process is carried out thereafter. In the common channel signalling system a great number of the signalling classes can be used. More particularly the system offers an increased freedom in the selection of the backward signals, which had been in a situation of an extreme shortage in the conventional signalling system. This will be a remarkable advantage for an application in an international signalling system and for effective operation of the nation-wide switching network.

The digital converter is used in the system in an attempt to take over some processing functions of the data communication in the electronic switching system. The data communication traffic is expected to show a remarkable increase in a near future. There are several types of digital converters for the terminal equipment of data communication system which use different signalling codes and speed according to the subject and the task of the equipment. But generally speaking such devices are designed to work in low speed. On the other hand a high speed data link is preferred in view of economy for use in a long distance main data circuit or for use with a computer terminal. The digital converter receives signals from various terminal equipments and converts it into a standard signal of a certain type suitable for the processing in the system and stored in the main memory devices in the switching system. After processing by the central processor the converted signals are transmitted on a line having a different signalling speed and signalling code so that switching operation between lines in different service classes is possible. In FIG. 2, LTU shows a line terminal unit of the digital converter and CCU shows a communication control unit provided common to a plurality of the line terminal units.

The present invention is not in such a high speed data link or digital converter by itself, but in accordance with the system of the present invention such the data link or the digital converter can be controlled by the data channel device (CHM, SCH) with a common interface with that of an ordinary input-output devices.

The speech path system of a switching system made in accordance with the present invention includes the feature that various devices, such as the scanner SCN, switch controller SC, and the relay controller RC for controlling relays in the trunk circuit are under the control of the duplicated signal receiver-distributors $SRD_0$, $SRD_1$.

In the conventional system as illustrated in FIG. 1, the central control units CC send out $1/n$ code information in order to obtain easy control of the various speech path equipments and a central pulse distributor CPD is provided for designating individual equipment to be operated. In a system according to the present invention a signal receiver-distributor is provided so that the speech path system and the processor system can be made very simple just to transmit the binary information code on the speech path address bus SPAB and the speech path answer bus SPWB. The signal receiver-distributor SRD decodes the binary coded signal into a $1/n$ code signal to be used for controlling the speech path equipment, and the sequence process and other process for controlling the instruction execution of the speech path system. Accordingly, the central control unit CC is not required to carry out such a particular switching process so that the central processor system including the central control units CC can be designed for wider applications.

In one aspect of the system of the present invention, the spare devices for obtaining a higher reliability can be provided only one device for a plurality of working devices.

FIGS. 17*a* and 17*b* show simplified schematic diagrams of the power supply system for the electronic switching system. An electronic switching system requires to be supplied several voltages as the current source for the electronic circuits. In accordance with one aspect of the present invention a common power supply system is used common to a plurality of the devices in order to decrease the equipment cost. In FIG. 17*a*, blocks POW are a pair of common power supply equipments either one of which is to be connected to the system by operating a switch SW at any time when the other equipment is faulty. Usually this power supply scheme is used for a non-duplicated speech path system. FIG. 17*b* shows an embodiment in which each one of the duplicated device, for instance $CC_0$ or $CC_1$ is supplied from separate power source POW in order to obtain more reliability.

As explained above in a system made in accordance with the present invention, an economical large capacity peripheral asynchronised memory devices, such as for instance a magnetic drum which can be made wth a considerably low cost per bit, are utilized to keep the copy of the content of the main memory devices, therefore, there is no need to provide a surplus redundancy scheme if compared with the conventional system. Furthermore the system offers advantages in that it has a possibility of separtate mode operation of the processing system without decreasing the service reliability, that it offers saving of the main memory devices by relieving the main memory device from memorizing a part of programs or data, that the data channel is introduced in the electronic switching system so as to control input-output devices, signal units for common channel signalling system, communication control unit, etc., in a standardized procedure, and that it can deal with trunk switching facility by the introduction of a four-wire trunk line network.

As a whole the switching system of the invention will offer a great advantage by the combination of the above features in obtaining an economical and a flexible electronic switching system.

The present invention is not limited to a particular embodiment as described above. Many modifications and alterations are possible without departing from the scope of the present invention.

We claim:

1. In a stored program controlled electronic telephone switching system, a processor system comprising in combination;

duplicated central control units operating in synchronism and including means for matching the information processed by each of said central control units;

duplicated data channel devices, each of said data channel devices comprising a channel multiplexer and a sub-channel equipment constructed to accomodate input-output units and other devices including a signal unit for a common channel signalling system and a data link line terminal unit of a digital trunk, under a common interface condition whenever such device is required;

a plurality of non-duplicated main memory devices accessible to any one of the above units or devices;

means for selectively coupling said data channel devices and central control units to said main memory devices;

a pair of peripheral memory devices operating in asynchronized mode and connected to each one of the duplicated data channel devices;

means for transferring information between the main memory devices and the peripheral devices via respective data channel devices;

means for periodically copying a part of the memory contents of the main memory devices alternately into respective ones of the peripheral memory devices to thereby duplicate the information to be processed, copied information from said peripheral memory devices being read out by transfering the copied information back into the main memory devices;

means for causing one central control unit and the part of the main memory devices to operate independently of the ever central control unit and another part of the main memory devices, said one central control unit and said part of the main memory devices forming one processing system, while the other central control unit and another part of the main memory devices forming another processing system.

2. A stored program controlled electronic switching system according to claim 1, wherein the data channel device includes means for accommodating a digital converter whereby a transmitted digital signal of a particular code is memorized in the main memory device and read out therefrom to form any desired code signal to be sent to a transmission path so as to effect digital signal switching.

3. A stored program controlled electronic switching system according to claim 1, further including a speech path system responsive to said central control units, and a binary coded information interface for separating the speech path system from the processing system said speech path system receiving information through the interface, includes means for distributing the information to its internal devices so as to effect a sequential switching operation of the system.

4. A stored program controlled electronic switching system according to claim 1, further including a speech path system which includes a two-wire speech path network and a four-wire speech path network and two-wire four-wire converting means for interconnecting said two-wire and four-wire speech path networks whereby the four-wire speech path network is accessible from the two-wire speech path network.

* * * * *

UNITED STATES PATENT OFFICE
CERTIFICATE OF CORRECTION

Patent No. 3,760,364 Dated September 18, 1973

Inventor(s) Masaya YAMAUCHI et al

It is certified that error appears in the above-identified patent and that said Letters Patent are hereby corrected as shown below:

Assignee: Delete "Nippson" and substitute -- Nippon --
After "Hitachi Limited" insert a semicolon (;)

Col. 1, lines 13-14 - Delete "relability" and substitute -- reliability --

Col. 2, lines 25-27 - "In another...are realized," should be a separate paragraph and should have a period (.) at the end.

line 28 - Delete "consist" and substitute -- consists -- line 47 - Delete "partial" and substitute -- portion -- line 68 - Delete "part" and substitute -- portions --

Col. 3, line lines 29-30 - Delete "interconnumicating" and substitute -- intercommunicating -- lines 49-50 - Delete "by taking the mutual matching for the processed date"

line 54 - Insert comma (,) after "Figure 1"

UNITED STATES PATENT OFFICE

CERTIFICATE OF CORRECTION

Patent No. 3,760,364 Dated September 18, 1973

Inventor(s) Masaya YAMAUCHI et al

It is certified that error appears in the above-identified patent and that said Letters Patent are hereby corrected as shown below:

CERTIFICATE OF CORRECTION - Page 2

Col. 4, line 45 - Insert comma (,) after "MEM"

line 47 - Delete "of there" and substitute -- of the -- line 63 - After "standardized" insert -- so that any input --

Col. 7, line 53 - Delete "but" and substitute -- bus --

Col. 12, line 18 - Delete "OUTSEL" and substitute -- $\overline{O}$UTSEL -- line 20 - Delete "OBSEL0" and substitute -- $\overline{O}$BSEL0 -- line 21 - Delete "OBSEL1" and substitute -- $\overline{O}$BSEL1 -- line 43 - "(V) Magnetic Drum Memory MDC, MDU" should be a heading.

Col. 13, line 4 - Delete "5" and substitute -- 6 -- line 5 - Delete "for" and substitute -- of --

Col. 14, line 39 - Delete "at last" and substitute -- of last --

FORM PO-1050 (10-69)

USCOMM-DC 60376-P69
★ U.S. GOVERNMENT PRINTING OFFICE : 1969 O—366-334.

UNITED STATES PATENT OFFICE
CERTIFICATE OF CORRECTION

Patent No. 3,760,364 Dated September 18, 1973

Inventor(s) Masaya YAMAUCHI et al

It is certified that error appears in the above-identified patent and that said Letters Patent are hereby corrected as shown below:

CERTIFICATE OF CORRECTION - Page 3

Col. 16, line 53 - After "function" insert a comma (,)

line 68 - "Interface Channel FCH" should be a heading.

Col. 17, lines 12-13 - "Character Processor CHP" should be a heading.

line 26 - "Line Control LCT" should be a heading.

line 40 - "Digital Converter LUT" should be a heading.

Col. 18, line 29 - After "buffer" insert -- on --

Col. 21, line 2 - Delete "Inorder" and substitute -- In order -- line 67 - Delete "in" and substitute -- of --

Col. 22, line 38 - Delete "as" and substitute -- the --

Col. 23, line 48 - Delete comma (,) after "invention"

Signed and sealed this 24th day of September 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
★ U.S. GOVERNMENT PRINTING OFFICE : 1969 O—366-334.